United States Patent
Park et al.

(10) Patent No.: US 9,024,726 B2
(45) Date of Patent: May 5, 2015

(54) REMOTE CONTROLLER AND CONTROL METHOD FOR A MULTIMEDIA DEVICE

(75) Inventors: Keunryang Park, Seoul (KR); Dojoon Lee, Seoul (KR); Kwangsoo Choi, Seoul (KR); Sunghee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 13/604,392

(22) Filed: Sep. 5, 2012

(65) Prior Publication Data

US 2013/0088332 A1 Apr. 11, 2013

Related U.S. Application Data

(60) Provisional application No. 61/583,200, filed on Jan. 5, 2012.

(30) Foreign Application Priority Data

Oct. 11, 2011 (KR) .................. 10-2011-0103615
Apr. 2, 2012 (KR) .................. 10-2012-0033873

(51) Int. Cl.
*H04Q 5/22* (2006.01)
*H04N 21/485* (2011.01)
*H04N 21/41* (2011.01)
(Continued)

(52) U.S. Cl.
CPC ......... *H04N 21/485* (2013.01); *H04N 21/4126* (2013.01); *H04N 21/42221* (2013.01); *H04N 21/42226* (2013.01); *H04N 21/472* (2013.01);
(Continued)

(58) Field of Classification Search
CPC ........... G06F 3/0346; H04N 21/42207; H04N 21/42224; H04N 5/76; H04N 21/436; H04N 21/4108; H04N 21/4126

USPC ........... 340/10.1, 426.13, 4.11, 12.22, 815.6; 715/719, 740; 345/173; 348/734, 348/E5.096, E5.103; 341/20, 176; 398/106; 455/41.2; 725/51

See application file for complete search history.

(56) References Cited

U.S. PATENT DOCUMENTS 6,401,059 B1    6/2002  Shen et al. ....................... 703/27
6,591,292 B1 *  7/2003  Morrison et al. ............. 709/206

(Continued)

FOREIGN PATENT DOCUMENTS

CN   101057208 A   10/2007
EP   1 631 069 A1   3/2006

(Continued)

OTHER PUBLICATIONS

Russian Decision to Grant a Patent dated Feb. 17, 2014 issued in Application No. 212131745/07 (with English translation).

(Continued)

*Primary Examiner* — Benjamin Lee
*Assistant Examiner* — Quang D Pham
(74) *Attorney, Agent, or Firm* — KED & Associates LLP

(57) ABSTRACT

A multimedia device is disclosed in a specification. The multimedia device comprises a first interface, a memory to store a code value of a function corresponding to an electronic device coupled to the multimedia device through the first interface, and a controller to control information indicative of the function of the electronic device, obtain the code value stored in memory after receiving a first signal selecting the function, and transmit a second signal including the code value through a second interface coupled to a remote controller.

11 Claims, 32 Drawing Sheets

(51) Int. Cl.
 *H04N 21/422* (2011.01)
 *H04N 21/472* (2011.01)
 *H04N 21/81* (2011.01)

(52) U.S. Cl.
 CPC ....... *H04N 21/8186* (2013.01); *H04N 21/4131* (2013.01)

(56) References Cited

U.S. PATENT DOCUMENTS

| | | | |
|---|---|---|---|
| 7,064,675 B2* | 6/2006 | Zigmond et al. | 340/12.53 |
| 2003/0081008 A1* | 5/2003 | Seo | 345/810 |
| 2004/0095317 A1 | 5/2004 | Zhang et al. | |
| 2006/0101338 A1 | 5/2006 | Kates | 715/716 |
| 2006/0158838 A1* | 7/2006 | Kinoshita et al. | 361/681 |
| 2006/0287851 A1* | 12/2006 | Kida et al. | 704/201 |
| 2007/0024462 A1* | 2/2007 | Kitaura | 340/825.22 |
| 2007/0162667 A1* | 7/2007 | Kim et al. | 710/62 |
| 2007/0162940 A1* | 7/2007 | Pae et al. | 725/80 |
| 2007/0176820 A1 | 8/2007 | Vidal | 341/176 |
| 2007/0229465 A1* | 10/2007 | Sakai et al. | 345/173 |
| 2009/0219174 A1* | 9/2009 | Kikuchi et al. | 341/20 |
| 2010/0100902 A1* | 4/2010 | Kaga | 725/37 |
| 2011/0007018 A1* | 1/2011 | McKinley et al. | 345/173 |
| 2011/0032433 A1* | 2/2011 | Sato | 348/705 |
| 2011/0061078 A1* | 3/2011 | Rothschild | 725/51 |
| 2011/0084867 A1* | 4/2011 | Friedlander | 341/176 |
| 2011/0157469 A1* | 6/2011 | McRae et al. | 348/554 |
| 2011/0219404 A1* | 9/2011 | Tsai | 725/38 |
| 2011/0265112 A1* | 10/2011 | Kwak | 725/25 |
| 2012/0019371 A1 | 1/2012 | Vidal | |
| 2012/0062468 A1* | 3/2012 | Chen et al. | 345/173 |
| 2012/0092564 A1* | 4/2012 | Bae | 348/734 |
| 2012/0139847 A1* | 6/2012 | Hunt | 345/173 |
| 2012/0173979 A1* | 7/2012 | Lee | 715/719 |
| 2012/0224101 A1* | 9/2012 | Pouw et al. | 348/554 |
| 2012/0268660 A1* | 10/2012 | Lee | 348/734 |
| 2012/0274863 A1* | 11/2012 | Chardon et al. | 348/734 |
| 2013/0265457 A1* | 10/2013 | Henty | 348/211.99 |

FOREIGN PATENT DOCUMENTS

| | | |
|---|---|---|
| JP | 10-003373 A | 1/1998 |
| JP | 2001-053779 A | 2/2001 |
| KR | 10-2006-0084884 | 7/2006 |
| KR | 10-2006-0101674 | 9/2006 |
| KR | 10-0780160 B1 | 11/2007 |
| KR | 10-2009-0121065 | 11/2009 |
| KR | 10-2010-0023317 | 3/2010 |
| KR | 10-2011-0061246 | 6/2011 |
| RU | 2 382 518 C2 | 2/2010 |
| RU | 2008 135 267 A | 3/2010 |
| RU | 2 427 097 C2 | 8/2011 |

OTHER PUBLICATIONS

Chinese Office Action dated Feb. 8, 2014 issued in Application No. 201210268707.1 (with English translation).
European Search Report dated Jan. 31, 2013 issued in Application No. 12 00 6222.
U.S. Appl. No. 13/545,714.

\* cited by examiner

FIG. 6

| TV function | Code value |
|---|---|
| Power | 0X08 |
| TV / external input | 0X0B |
| 1 | 0X11 |
| 2 | 0X12 |
| 3 | 0X13 |
| 4 | 0X14 |
| 5 | 0X15 |
| 6 | 0X16 |
| 7 | 0X17 |
| 8 | 0X18 |
| 9 | 0X19 |
| 0 | 0X10 |
| Sleep | 0X02 |
| Muting(Mate) | 0X09 |
| Channel △ | 0X00 |
| Channel ▽ | 0X01 |
| Volume △ | 0X03 |
| Volume ▽ | 0X02 |
| ⋮ | ⋮ |

FIG. 7

| Address | Kind of device | Function | Code value |
|---|---|---|---|
| Address 1 | STB | Function 1 | 0X01 |
| | | Function 2 | 0X02 |
| | | Function 3 | 0X03 |
| | | ⋮ | ⋮ |
| Address 2 | BD player | Function 4 | 0X51 |
| | | Function 5 | 0X52 |
| | | Function 6 | 0X53 |
| | | ⋮ | ⋮ |
| ⋮ | ⋮ | ⋮ | ⋮ |

…

REMOTE CONTROLLER AND CONTROL METHOD FOR A MULTIMEDIA DEVICE

This application claims the benefit of Korean Patent Application Nos. 10-2011-0103615, filed on Oct. 11, 2011, 10-2012-0033873 filed on Apr. 2, 2012, and U.S. Provisional Patent Application No. 61/583,200 filed on Jan. 5, 2012, which are hereby incorporated by reference as if fully set forth herein.

BACKGROUND

1. Field

One or more embodiments herein relate to control of a terminal.

2. Background

With development of electronic technology, various kinds of electronic devices have been increasingly developed and popularized. The latest electronic devices have a function for receiving a remote controller signal for user convenience. As a result, it is possible for users to control various kinds of electronic devices, such as a television (TV), an audio player, a digital versatile disc (DVD) player, an air conditioner, and an electric fan, using remote controllers.

Meanwhile, a recently developed multimedia device (for example, a TV) has a function for receiving various kinds of information in a state in which the multimedia device is connected to a network, such as the Internet. In order to control the multimedia device and electronic devices, such as a set top box (STB), a Blu-ray disc (BD) player, a personal computer (PC), connected to the multimedia device, therefore, a number of remote controller corresponding to the number of the devices are required.

Of course, technology for controlling a plurality of devices using a remote controller is under discussion. However, most of the devices must use the same communication protocol. Also, it is impossible to store all infrared (IR) codes due to the capacity of a memory. In particular, it is impossible to manufacture a remote controller that is capable of predicting all new type electronic devices which will show up in future and IR code values of the electronic device.

SUMMARY

One or more embodiments described herein correspond to a remote controller and a method for controlling a multimedia device. According to one embodiment, a hybrid remote controller is provided that is capable of controlling different kinds of devices in two different communication protocols. According to another embodiment, a method is provided to control different kinds of devices while reducing use of a memory of a remote controller.

According to another embodiment, an improved graphical user interface is provided for a multimedia device communicating with the hybrid remote controller.

According to another embodiment, a method is provided for controlling both a graphic image provided by a multimedia device and a graphic image provided by an external electronic device connected to the multimedia device.

In accordance with one embodiment, a method for controlling a multimedia device comprises a step of displaying information indicative of at least one function of an electronic device, a step of receiving a first signal selecting the function, a step of obtaining a code value corresponding to the selected function from a memory, and a step of transmitting a second signal including the code value through a first link that is coupled to a remote controller, wherein the electronic device is coupled to the multimedia device for displaying images on a screen.

In another aspect, a multimedia device comprises a first interface, a memory to store a code value of a function corresponding to an electronic device coupled to the multimedia device through the first interface, and a controller to control information indicative of the function of the electronic device, obtain the code value stored in memory after receiving a first signal selecting the function, and transmit a second signal including the code value through a second interface coupled to a remote controller.

In a further aspect, a method for controlling a multimedia device in a remote controller comprises a step of transmitting the first signal from a remote controller to the multimedia device, a step of receiving a code value corresponding to the selected function from the multimedia device, and a step of transmitting a second signal including the code value to the electronic device, wherein first signal is received through a first interface and the second signal is transmitted through a second interface of the remote controller and wherein the first and second interfaces have different communication protocols.

In a further aspect, a remote controller comprises a first interface having a first communication protocol, a second interface having a second communication protocol, and a controller to transmit a first signal for selecting a function of an electronic device coupled to a multimedia device through the first interface, to receive a code value corresponding to the selected function from the multimedia device through the first interface, and to transmit a second signal including the code value to an electronic device through the second interface, wherein the first and second interfaces have different communication protocols.

In a further aspect, a method for controlling a multimedia device comprises a step of displaying at least one of first graphic image indicative of at least one function of an electronic device from first source or second graphic image indicative of at least one function of the electronic device from second source, wherein the first graphic image is displayed in a first area of a screen and the second graphic image is displayed in a second area, a step of receiving a first signal selecting the function, a step of obtaining a code value corresponding to the selected function, and a step of transmitting a second signal including the code value through a first link that is coupled to a remote controller, wherein the electronic device is coupled to the multimedia device for displaying images on a screen of the multimedia device and wherein a cursor on the screen is activated when the cursor is located in the first area and the cursor on the screen is deactivated when the cursor is located in the second area.

It is to be understood that both the foregoing general description and the following detailed description of the embodiments are exemplary and explanatory and are intended to provide further explanation as claimed.

BRIEF DESCRIPTION OF THE DRAWINGS

FIG. 6 is a view showing an example of a storage of infrared (IR) code values stored in the multimedia device according to one embodiment.

FIG. 7 is a view showing another example of a storage of IR code values stored in the multimedia device.

DETAILED DESCRIPTION

Figure 1:
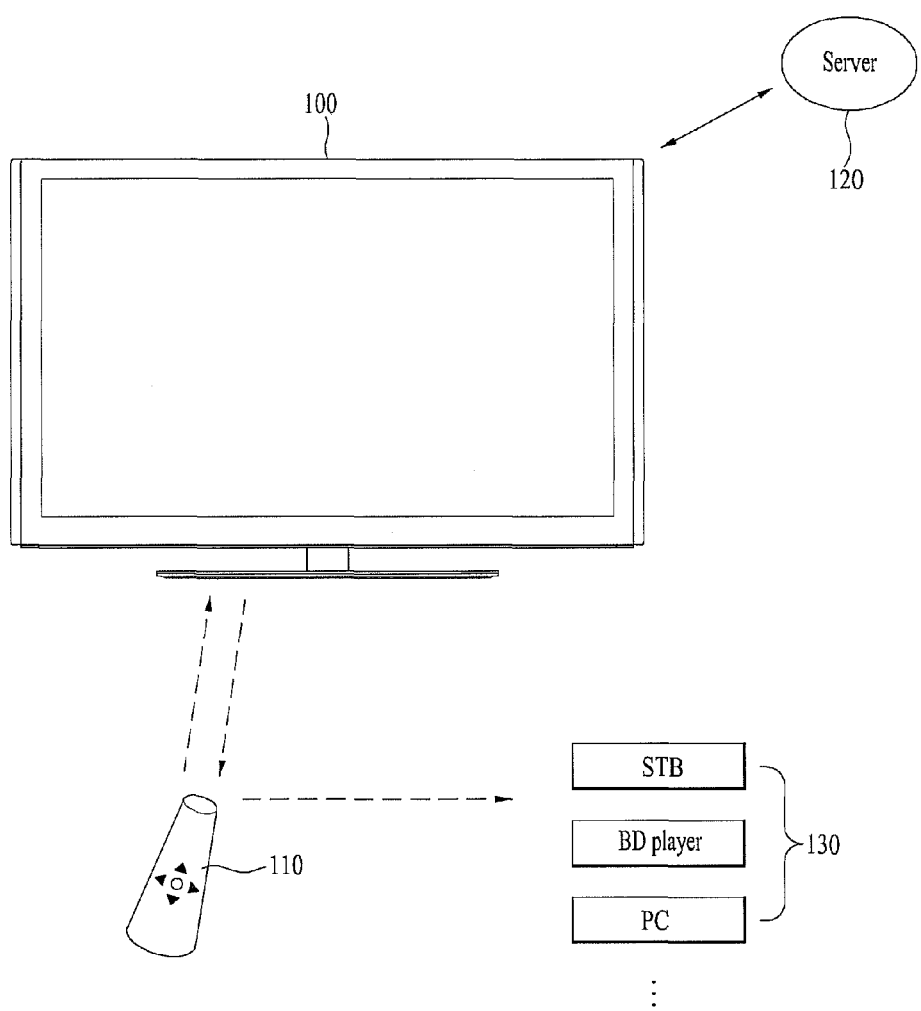
FIG. 1 is a view schematically showing a system including a multimedia device, a remote controller, a server, and at least one electronic device according to one embodiment.

In accordance with one embodiment, a multimedia device is an intelligent electronic device having a computer or processor supporting function as well as a broadcast receiving function. As an Internet function is added to the multimedia device in addition to a broadcast receiving function, the multimedia device may include an interface which can be more conveniently used than a writing type input device, a touchscreen, a touchpad, or a space remote controller.

Also, the multimedia device may be connected to the Internet or a computer under the support of a wired or wireless Internet function so that emailing, web browsing, banking, and gaming functions can be performed. For such various functions, a standardized general-purpose operating system (OS) may be used.

In accordance with one embodiment, the multimedia device may have various applications that can be freely added or removed, for example, on a general-purpose OS kernel, and therefore, it is possible to perform various user-friendly functions. More specifically, examples of the multimedia device may include an Internet television (TV), an Internet protocol TV (IPTV), a network TV, a hybrid broadcast broadband television (HBBTV), a smart TV, and an open hybrid TV (OHTV). Embodiments described herein may be applied, for example, to a smart phone, a personal computer (PC), or an electric home appliance.

A first embodiment provides a solution for controlling an STB, a BD player, a PC, a laptop computer, and a tablet PC using a universal remote controller to control a TV connected to the STB, the BD player, the PC, the laptop computer, and the tablet PC. For example, a TV capable of networking receives a table of infrared (IR) codes corresponding to the respective devices from an external server and stores the received table of IR codes. Also, the TV transmits an IR code value for controlling a specific function of a specific device to the remote controller through a radio frequency (RF) communication. Upon receiving the IR code value, the remote controller forwards the IR code value to the specific device through IR communication.

A second embodiment provides a solution for setting devices to be controlled to use a universal remote controller. In connection with this embodiment, it is possible to use the following three technical methods.

A) Automatic Detecting Technology

In a case in which a TV is connected to devices to be controlled using a universal remote controller via a high definition multimedia interface (HDMI), information regarding kinds, names, and model names of the devices is transmitted from the devices to the TV. Upon receiving the information regarding the devices, the TV may be connected to an external server so that the TV can automatically receive IR information corresponding to the respective devices. In this case, it is not necessary for a user to register the devices. Of course, the device connected to the TV via the HDMI or a cable may not transmit the above-mentioned information, or errors may occur, according to circumstances. The following solutions described in paragraph B) and C) may solve the above problems.

B) Hybrid Technology

In a case in which the TV is connected to a STB, the TV displays identification information of at least one STB manufacture or cable station that can be selected by a user. For example, in a case in which the number of enterprises providing a related service in Korea is three (for example, QOOK TV, BTV, and UPLUS), an option for selecting one of the three enterprises is provided. At this time, in a case in which the user selects a specific enterprise, the TV automatically receives an IR table corresponding to a remote controller of the corresponding enterprise from an external server.

C) User Input Method

The technology described in paragraph B) may not be used due to change of networking environment or technical errors. For this reason, it is possible for a user to directly input the kind and model name of an external device to be controlled using a universal remote controller.

A third embodiment provides a solution for controlling an OSD provided by an external device, e.g. an STB, not an OSD provided by the TV, using a remote controller. (In particular, a remote controller according to one embodiment is designed such that the position of a pointer on a screen of the TV according to the motion of the remote controller.)

The TV displays a TV OSD for controlling the STB connected to the TV via a HDMI. At this time, the motion of the remote controller may be controlled to locate the pointer in a corresponding region so that a user can easily execute a desired function of the STB. On the other hand, other functions which are not provided by the TV OSD may be considered. For example, functions which were not provided by an initial STB or menu options are not provided by the TV OSD. At this time, of course, an STB OSD is displayed. However, the STB OSD is image data that cannot be selected using a pointer of a motion remote controller. Therefore, it is necessary to provide a solution for controlling the STB OSD by clicking an arrow button of the motion remote controller.

For example, in a case in which a downward arrow button of the motion remote controller is clicked, an RF signal corresponding thereto is transmitted to the TV. The TV transmits an IR signal corresponding thereto to the remote controller via an RD network.

A fourth embodiment provides a channel browsing function which is flexibly changed based on a connected STB, not an electronic program guide (EPG) provided by the existing broadcasting station. Also, the following two methods may be considered as a solution for realizing the fourth embodiment.

A) It is assumed that there is an external server that knows information (for example, thumbnail images, broadcast time, supplementary information, characters, etc.) regarding all channels provided by the corresponding STB. Consequently, it is possible for the TV according to one embodiment to inform the external server of the type of the presently connected STB so that the TV can receive information regarding each channel. Also, at least two pieces of channel information may be located at one side of the screen, and a user may generate the motion of the remote controller to easily confirm a desired channel group.

B) On the other hand, if the server as described in paragraph A) does not exist, the TV may be operated in a background mode to scan the respective channels. For example, the respective channels may be scanned to capture video information or audio information with the result that it is possible to extract basic information or thumbnail image data regarding content provided by the respective channels.

FIG. 1 is a view schematically showing a system including a multimedia device 100, a remote controller 110, a server 120, and at least one electronic device 130 according to one embodiment.

According to some applications, it is necessary to provide a plurality of remote controllers 110 corresponding to the number of electronic devices 130 to be controlled. Also, it is necessary for a universal remote controller to store all IR code values of the respective electronic devices 130. However, a remote controller of this type has limited memory capacity which makes it difficult or impossible to store all IR code values of the respective electronic devices 130.

In contrast, multimedia device 100 may periodically update IR code values necessary to control electronic devices from the server 120 connected to the multimedia device 100 via a network, such as the Internet. An embodiment of updating IR code values according to user request may correspond to one specific embodiment.

Meanwhile, it is assumed that the remote controller 110 and the multimedia device 100 transmit and receive data to and from each other using a first communication method (for example, Bluetooth). If the remote controller 110 requests an IR code value corresponding to a specific function of a specific electronic device from the multimedia device 100, the multimedia device 100 retrieves a storage (DB) stored therein and transmits a corresponding IR code value to the remote controller 110.

The remote controller 110 forwards the IR code value received from the multimedia device 100 to a corresponding electronic device 130 using a second communication method (for example, IR communication). That is, according to one embodiment, remote controller 110 may serve as a relay station and therefore, it is not necessary to use a large-capacity memory.

Figure 2:
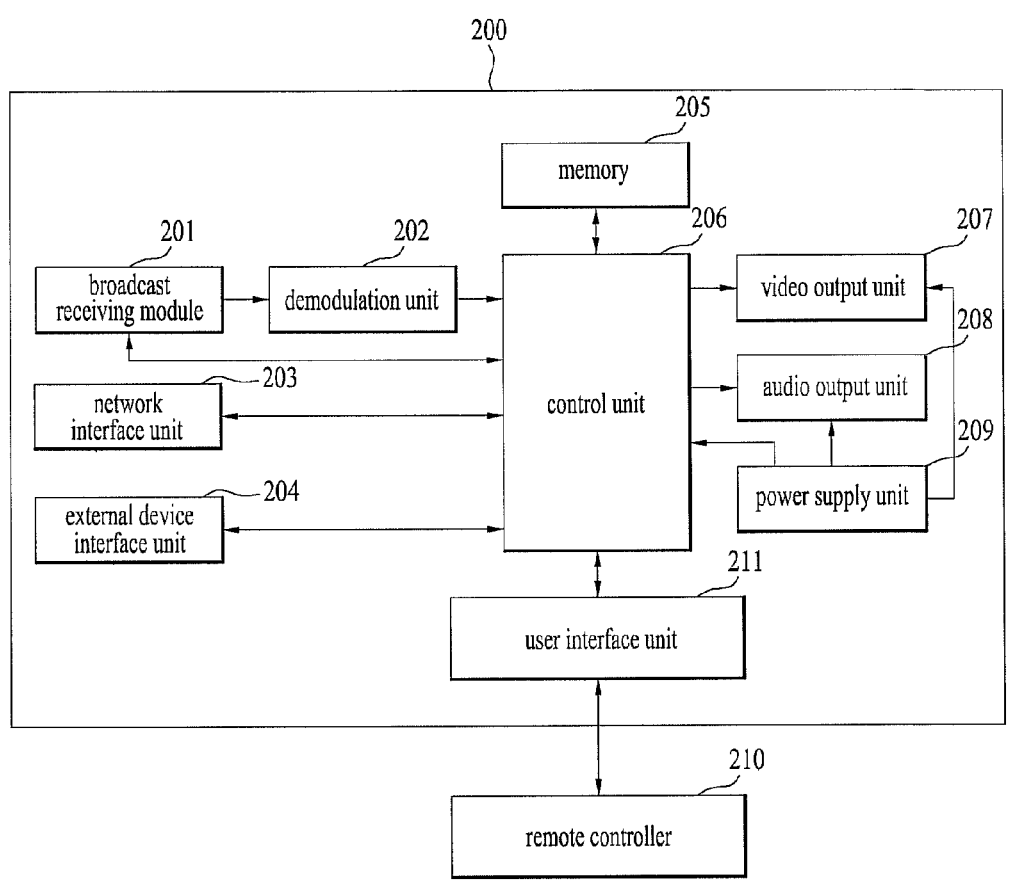
FIG. 2 is a block diagram showing components of a multimedia device according to one embodiment.

FIG. 2 is a block diagram showing components of a multimedia device according to one embodiment. A multimedia device 200 shown in FIG. 2 may be supplementarily interpreted with reference to the description of the multimedia device 100 shown in FIG. 1.

As shown in FIG. 2, the multimedia device 200 according to one embodiment includes a broadcast receiving module 201, a demodulation unit 202, a network interface unit 203, an external device interface unit 204, a memory 205, a control unit 206, a video output unit 207, an audio output unit 208, a power supply unit 209, and a user interface unit 211. The multimedia device 200 is designed to perform data communication with a remote controller 210. The remote controller 210 will be described below in detail with reference to FIGS. 4 and 5.

The broadcast receiving module 201 may be designed, for example, as a RF tuner or as an interface for receiving broadcast data from an external device, such as a set top box (STB). The broadcast receiving module 201 may receive, for example, a single carrier RF broadcast signal according to an advanced television system committee (ATSC) system or a plural carrier RF broadcast signal according to a digital video broadcasting (DVB) system.

The demodulation unit 202 receives and demodulates a digital IF signal DIF converted by the broadcast receiving module 201. For example, in a case in which the digital IF signal output from the broadcast receiving module 201 is based on the ATSC system, the demodulation unit 202 performs, for example, 8-vestigal side band (8-VSB) demodulation. Also, the demodulation unit 202 may perform channel decoding.

The external device interface unit 204 enables data communication between an external device and the multimedia device 200. The external device interface unit 204 may be connected to an external device, such as a digital versatile disk (DVD) player, a Blu-ray disc (BD) player, a game console, a camera, a camcorder, a computer (laptop computer), or an STB, in a wired or wireless fashion. The external device interface unit 204 transmits video, audio, or data signals input from the outside via the external device connected to the external device interface unit 204 to the control unit 206. Also, the external device interface unit 204 may output video, audio, or data signals processed by the control unit 206 to the external device.

The external device interface unit 204 may include, for example, a universal serial bus (USB) terminal, a composite video banking sync (CVBS) terminal, a component terminal, an S-video terminal (analog), a digital visual interface (DVI) terminal, a high definition multimedia interface (HDMI) terminal, a RGB terminal, and a D-SUB terminal.

The network interface unit 203 provides an interface for connecting the multimedia device 200 to a wired/wireless network, including the Internet. The network interface unit 203 may include, for example, an Ethernet terminal for connection with a wired network. Also, the network interface unit 203 may use communication standards, such as wireless LAN (WLAN) (Wi-Fi), wireless broadband (WiBro), world interoperability for microwave access (WiMax), high speed downlink packet access (HSDPA), for connection with a wireless network.

The network interface unit 203 may transmit or receive data to or from another user or another electronic device via the network connected to the network interface unit 203 or another network linked to the network connected to the network interface unit 203.

The memory 205 may store a program for processing and controlling signals in the control unit 206 or a signal-processed video, audio, or data signal. Also, the memory 205 may function to temporarily store the video, audio, or data signal input from the external device interface unit 204 or the network interface unit 203. In addition, the memory 205 stores, for example, various operating systems (OS), middleware, and a platform.

The user interface unit 211 may transmit a signal input by a user to the control unit 206 or may transmit a signal from the control unit 206 to an external device (for example, the remote controller 210). For example, the user interface unit 211 is designed to receive and process a control signal, such as power on/off, channel selection, or screen setting, or to transmit a control signal from the control unit 206 to the remote controller 210, according to various communication modes, such as a radio frequency (RF) communication mode and an infrared (IR) communication mode.

The control unit 206 may demultiplex a stream input via the broadcast receiving module 201, the demodulation unit 202, the network interface unit 203, or the external device interface unit 204, or may process demultiplexed signals to generate and output a signal for outputting a video or audio. The control unit 206 will be described below in more detail with reference to FIG. 3.

The video output unit 207 converts a video signal, a data signal, or an OSD signal processed by the control unit 206 or a video signal or a data signal received by the external device interface unit 204 into red (R), green (G), and blue (B) signals to generate a drive signal. The video output unit 207 may be realized by a plasma display panel (PDP), a liquid crystal display (LCD), an organic light emitting diode (OLED), a flexible display, or a three-dimensional (3D) display.

The audio output unit 208 receives a signal, such as a stereo signal, a 3.1 channel signal, or a 5.1 channel signal, audio-processed by the control unit 206, and outputs the received signal as an audio. The audio output unit 208 may be realized by various types of speakers.

The power supply unit 209 supplies power to the multimedia device 200. In particular, the power supply unit 170 may supply power to the control unit 206, which may be configured in the form of a system on chip (SOC), the video output unit 207 for displaying a video, and the audio output unit 208 for outputting an audio.

Under control of the control unit 206, the network interface unit 203 is connected to a specific server. In addition, IR code values received from the specific server are designed to be stored in the memory 205. Meanwhile, the IR code values are necessary to control an electronic device connected to external device interface unit 204.

According to request of the remote controller 210, an IR code value corresponding to a specific function of a specific electronic device is transmitted to the remote controller 210 via the user interface unit 211. At this time, a Bluetooth communication method may be adopted as previously described.

Figure 3:
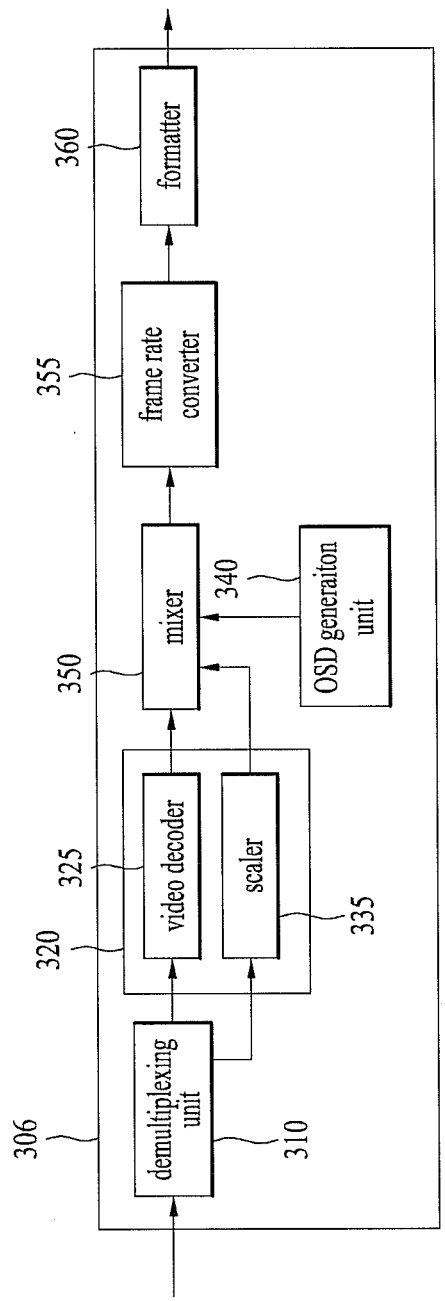
FIG. 3 is a block diagram showing a control unit shown in FIG. 2.

FIG. 3 is a block diagram showing the control unit shown in FIG. 2 in more detail. As shown in FIG. 3, the control unit 306 of the multimedia device includes a demultiplexing unit 310, a video processing unit 320, an OSD generation unit 340, a mixer 350, a frame rate converter 355, and a formatter 360. Also, according to another embodiment, the control unit may further include an audio processing unit and a data processing unit.

The demultiplexing unit 310 demultiplexes a stream input to the demultiplexing unit 310. For example, in a case in which MPEG-2 TS is input to the demultiplexing unit 310, the demultiplexing unit 310 may demultiplex the MPEG-2 TS so that the MPEG-2 TS is divided into video, audio, and data signals.

The video processing unit 320 may process the demultiplexed video signal. To this end, the video processing unit 320 may include a video decoder 325 and a scaler 335. The video decoder 325 decodes the demultiplexed video signal, and the scaler 335 scales the resolution of the decoded video signal so that the decoded video signal can be output to the video output unit. The video signal decoded by the video processing unit 320 is input to the mixer 350.

The OSD generation unit 340 generates an OSD signal according to user input or by itself. Consequently, the mixer 350 may mix the OSD signal generated by the OSD generation unit 340 with the decoded video signal processed by the video processing unit 320.

The mixed signal is provided to the formatter 360. As the decoded broadcast video signal or an external input signal is mixed with the OSD signal, an OSD may be overlaid on a broadcast video or an external input video.

The frame rate converter (FRC) 355 may convert the frame rate of an input video. For example, the frame rate converter 355 may convert a frame rate of 60 Hz into 120 Hz or 240 Hz.

The formatter 360 receives a signal output from the frame rate converter 355, changes the format of the received signal so that the signal is suitable for the video output unit, and outputs the signal, the format of which has been changed. For example, R, G, and B data signals may be output. The R, G, and B data signals may be output as low voltage differential signaling (LVDS) or mini-LVDS.

An OSD to select an electronic device and a function to be controlled by the remote controller may be generated by the OSD generation unit 340 as described above. Also, the above-mentioned mixer 350 may be further designed to make a form in which the OSD is overlaid on a general broadcast screen. The form in which the OSD is overlaid on the general broadcast screen may be understood from the description given with reference to FIGS. 10 to 18.

Figure 4:
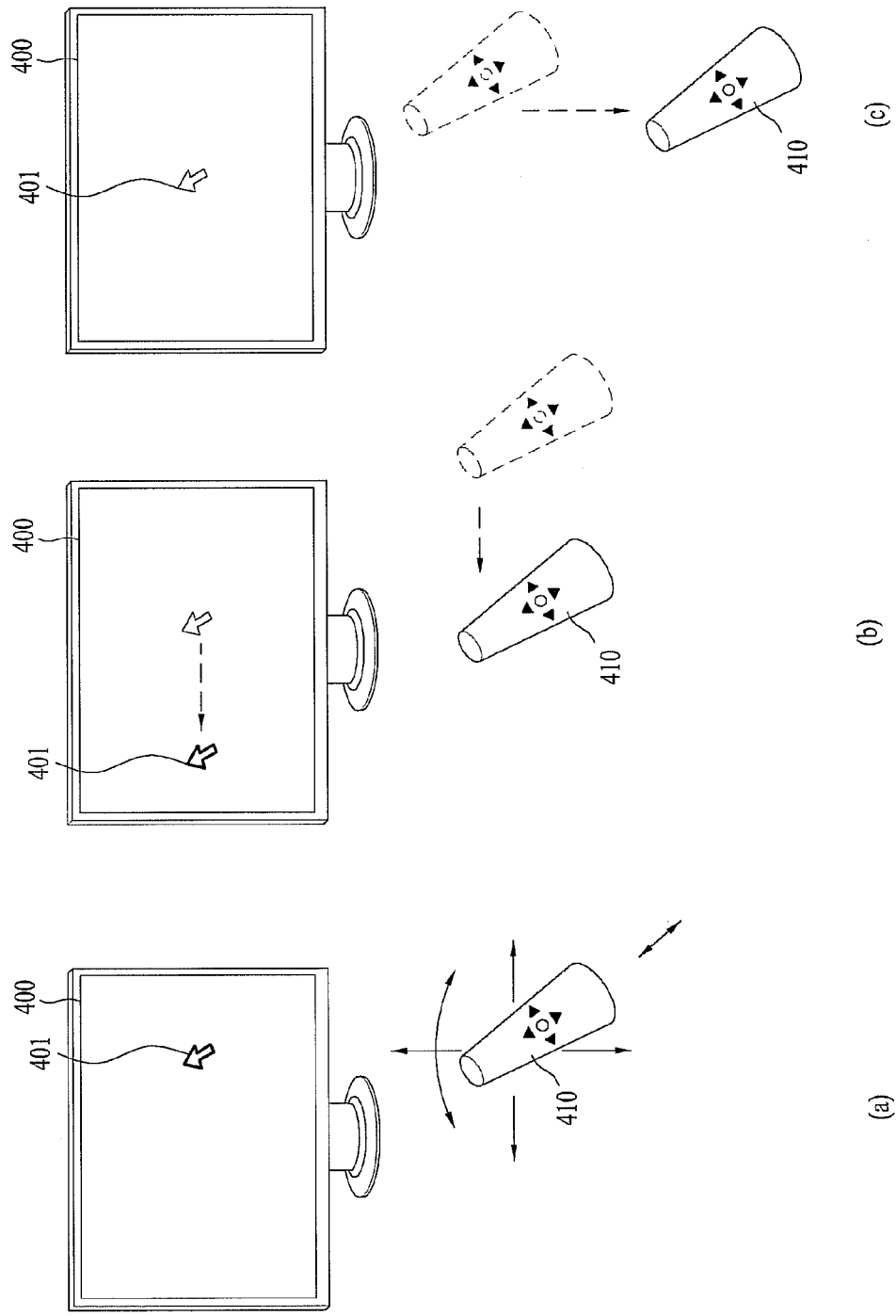
FIG. 4 is a view simply showing the external appearance of a remote controller according to one embodiment.

FIG. 4 is a view simply showing the external appearance of a remote controller according to one embodiment. As shown in FIG. 4(*a*), a pointer 401 corresponding to motion of a remote controller 410 is displayed on a screen of a multimedia device 400. A user may move the remote controller 410 from side to side (FIG. 4(b)) or upward and downward (FIG. 4(c)), or may rotate the remote controller 410. The remote controller 410 may be referred to as a space remote controller since the pointer 401 is moved and displayed according to the motion of the remote controller 410 in a three-dimensional (3D) space.

When the user moves the remote controller 410 to the left side as shown in FIG. 4(b), the pointer 401 displayed on the screen of the multimedia device 400 also moves to the left side. Meanwhile, information regarding the motion of the remote controller 410 sensed by a sensor of the remote controller 410 is transmitted to the multimedia device 400. The multimedia device 400 may calculate coordinates of the pointer 401 from the information regarding the motion of the remote controller 410. The multimedia device 400 may display the pointer 401 so that the pointer 401 corresponds to the calculated coordinates.

On the other hand, when the user moves the remote controller 410 downward as shown in FIG. 4(c), the pointer 401 displayed on the screen of the multimedia device 400 also moves downward. Therefore, it is possible to rapidly select a specific region in the screen of the multimedia device 400 using remote controller 410.

Figure 5:
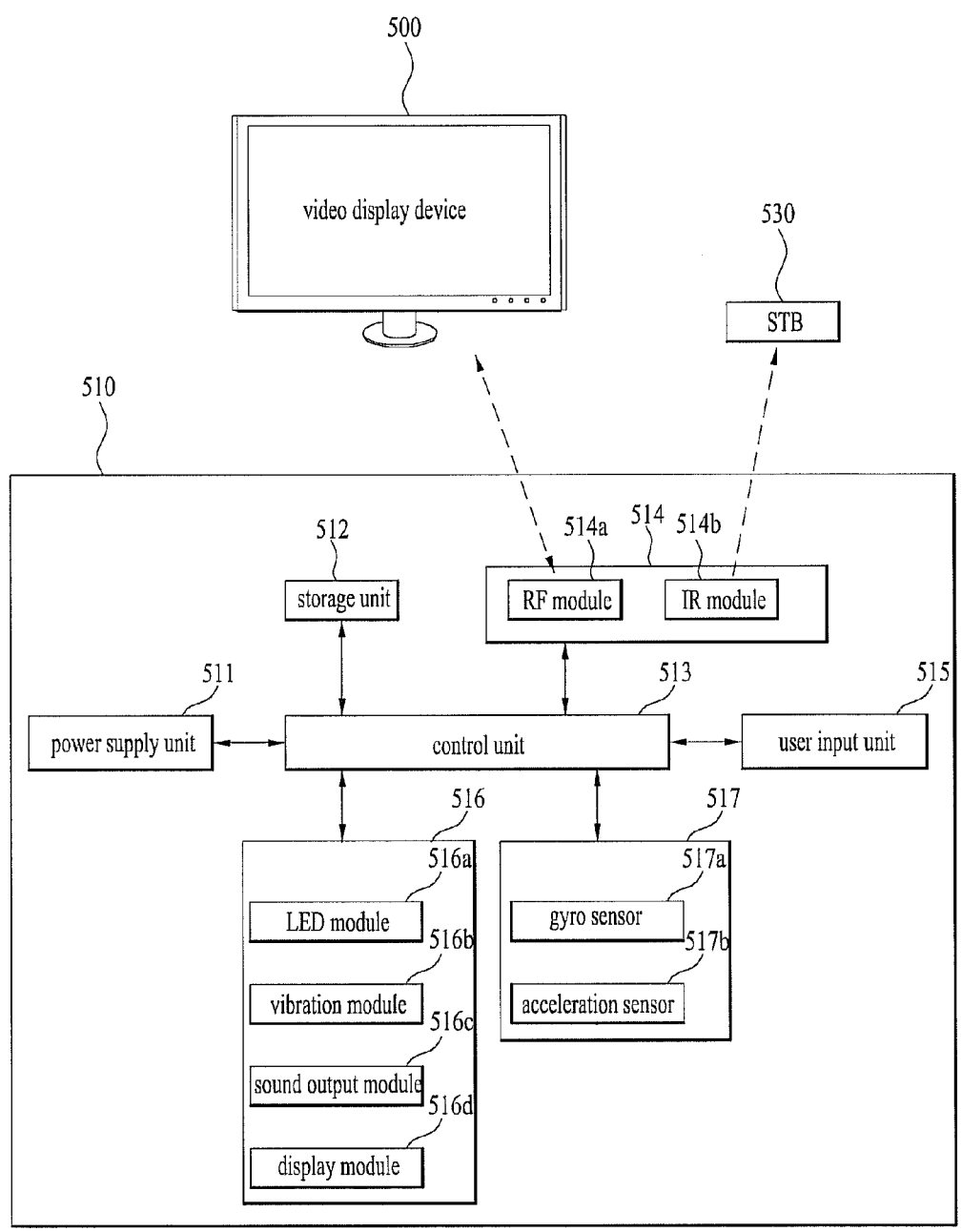
FIG. 5 is a block diagram showing components of the remote controller shown in FIG. 4.

FIG. 5 is a block diagram showing components of the remote controller shown in FIG. 4 in detail. As shown in FIG. 5, the remote controller 510 includes a wireless communication unit 514, a user input unit 515, a sensor unit 517, an output unit 516, a power supply unit 511, a storage unit 512, and a control unit 513.

The wireless communication unit 514 is designed to communicate with an arbitrary external device. In particular, according to one embodiment, an RF module 514a is designed to perform data communication with a multimedia device 500, and an IR module 514b is designed to perform infrared communication with an external electronic device 530 (for example, an STB).

Therefore, it is possible to realize the remote controller 510 so that the remote controller 510 can serve as a relay station for forwarding an IR code value received from the multimedia device 500 to the STB 530.

In addition, according to one embodiment, the remote controller 510 transmits a signal containing information regarding the motion of the remote controller 510 to the multimedia device 500 via the RF module 514a. Also, the remote controller 510 may receive a signal transmitted from the multimedia device 500 via the RF module 514a. Also, the remote controller 510 may transmit a command for power on/off, channel change, or volume change to the multimedia device 500 via the IR module 514b, as needed.

The user input unit 515 may be realized by a keypad, a button, a touchpad, or a touchscreen. The sensor unit 517 may include a gyro sensor 517a or an acceleration sensor 517b. The gyro sensor 517a may sense information regarding the motion of the remote controller 510. For example, the gyro sensor 517a may sense information regarding the motion of the remote controller 510 on the basis of x, y, and z axes. The acceleration sensor 517b may sense information regarding movement velocity of the remote controller 510. Meanwhile, the sensor unit 517 may further include a distance measurement sensor for sensing the distance between the remote controller 510 and the multimedia device 500.

The output unit 516 may output a video or audio signal corresponding to the manipulation of the user input unit 515 or a signal transmitted from the multimedia device 500. For example, the output unit 516 may include a light emitting diode (LED) module 516a configured to be driven when the user input unit 515 is manipulated or when a signal is transmitted and received between the remote controller 510 and the multimedia device 500 through the wireless communication unit 514, a vibration module 516b for generating vibration, a sound output module 516c for outputting a sound, or a display module 516d for outputting a video.

The power supply unit 511 supplies power to the respective components of the remote controller 510. When the remote controller 510 is not moved for a predetermined time, the power supply unit 511 may stop the supply of power to the remote controller 510 to reduce power consumption.

The storage unit 512 may store various kinds of programs necessary for control or motion of the remote controller 510 and application data. The control unit 513 controls overall operations of the remote controller 510. For example, the control unit 513 may transmit a signal corresponding to predetermined key manipulation of the user input unit 515 or a signal corresponding to the motion of the remote controller 510 sensed by the sensor unit 517 to the multimedia device 500 or to the STB 530 through the wireless communication unit 514.

FIG. 6 is a view showing an example of a storage of IR code values stored in the multimedia device according to one embodiment. The memory 205 of the multimedia device as shown in FIG. 2 is designed so that a storage shown in FIG. 6 is constructed in the memory 205. As shown in FIG. 6, IR code values corresponding to functions of a television, one example of an external electronic device, are mapped. Also, the storage shown in FIG. 6 is updated through communication with an external server according to user request or periodically.

Since the multimedia device according to one embodiment includes the storage shown in FIG. 6, it is possible for the multimedia device to transmit an IR code value corresponding to a specific function of a specific electronic device at any time according to request of the remote controller.

FIG. 7 is a view showing another example of a storage of IR code values stored in the multimedia device according to one embodiment. As shown in FIG. 7, the storage is designed so that information regarding a plurality of devices is stored in different memory addresses, unlike FIG. 6. That is, IR code values corresponding to functions of a STB are stored in a first memory address, and IR code values corresponding to functions of a Blu-ray disc (BD) player are stored in a second memory address.

In a case in which the storage is designed as shown in FIG. 7, therefore, it is possible to realize an OSD corresponding to a specific electronic device and to increase access speed to a specific function of the specific electronic device.

Although two devices are illustrated in FIG. 7, the number of external electronic devices that can be controlled by one remote controller may be greater than two since the multimedia device can update the storage shown in FIG. 7 at any time through communication with a server. Therefore, in at least some applications, it is not necessary to change the memory of the remote controller.

Figure 8:
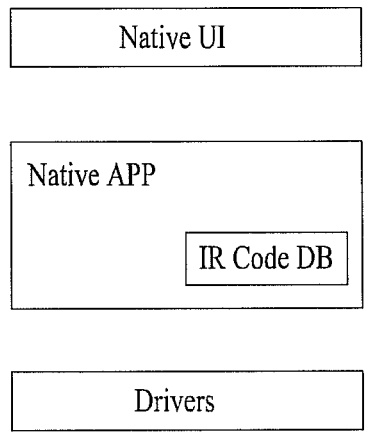
FIGS. 8 and 9 are views illustrating middleware storing the storage shown in FIG. 6 or 7.
Figure 9:
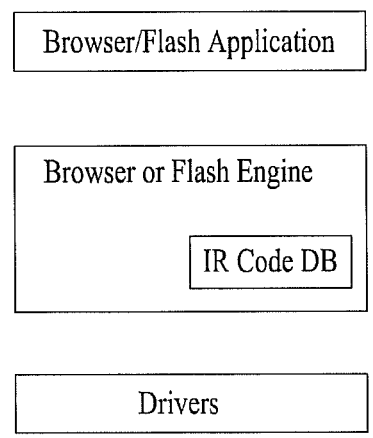

FIGS. 8 and 9 are views illustrating middleware storing the storage shown in FIG. 6 or 7. Specifically, FIGS. 8 and 9 are views illustrating a design structure of middleware necessary to construct the above-mentioned storage (see FIG. 6 or 7). For example, the middleware may be designed so that the storage shown in FIG. 6 or 7 is located in a native application as shown in FIG. 8.

According to one embodiment, the middleware may be designed so that the storage shown in FIG. 6 or 7 is located in a flash engine or browser. Meanwhile, in a case in which the middleware is designed as shown in FIG. 8, it is unnecessary to change the structure of the existing platform.

In addition, in a case in which another external electronic device, instead of the multimedia device, is to be controlled using the remote controller, two solutions for specifying the external electronic device may be proposed. A first solution will hereinafter be described with reference to FIG. 10 and a second solution will be described below with reference to FIG. 11.

Figure 10:
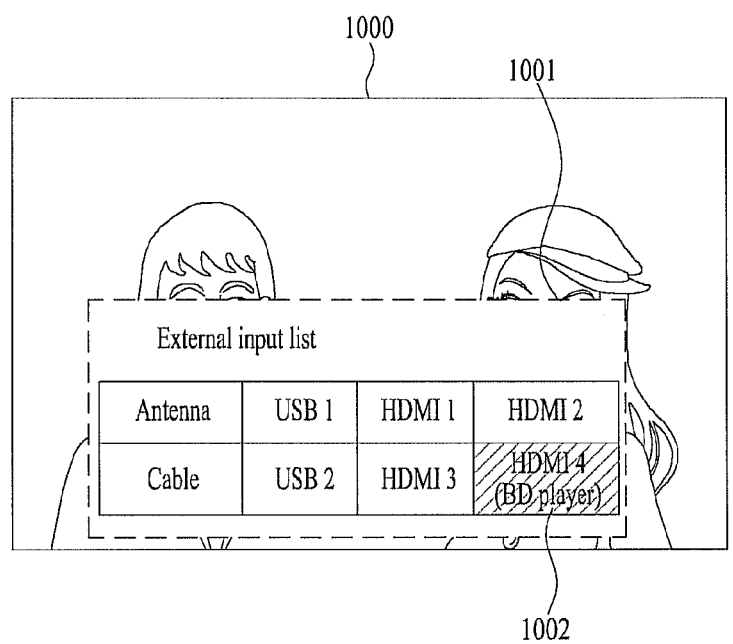
FIG. 10 is a view illustrating a first on screen display (OSD) provided by the multimedia device according to one embodiment.

FIG. 10 is a view illustrating a first on screen display (OSD) provided by the multimedia device. The OSD shown in FIG. 10 is displayed when a user pushes a key button for selecting an external input list. For example, in a case in which a user, who is watching a broadcast through a multimedia device 1000, wishes to control another external electronic device, the user may push a key button attached to the remote controller or a local key button attached to the multimedia device 1000.

At this time, the multimedia device 1000 displays an external input list 1001 which can be selected by the user as shown in FIG. 10. The external input list 1001 may be limited to devices having IR code values stored in the multimedia device.

Also, the external input list 1001 may include a region 1002 for displaying not only names of primary terminals but also names of devices connected via the corresponding terminals. Therefore, it is possible for a user to more easily and rapidly select a device which the user wishes to control.

Figure 11:
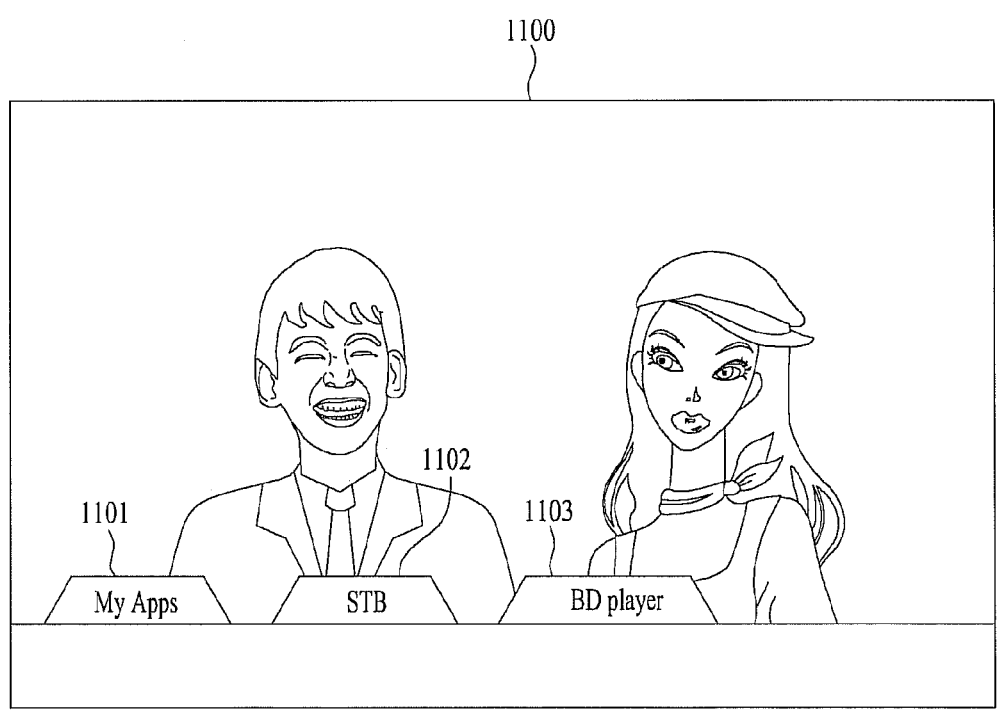
FIG. 11 is a view illustrating a second OSD provided by the multimedia device according to one embodiment.

FIG. 11 is a view illustrating a second OSD provided by the multimedia device according to another embodiment. As shown in FIG. 11, a list of devices that can be controlled using the remote controller is displayed in the form of tabs, unlike FIG. 10. For example, in a case in which a user, who is watching a broadcast through a multimedia device 1100, wishes to control another external electronic device, the user may push a key button attached to the remote controller or a local key button attached to the multimedia device 1100.

At this time, the multimedia device 1100 displays external input devices which can be controlled by the user in the form of tabs 1102 and 1103, as shown in FIG. 11. The tabs 1102 and 1103 may be limited to devices having IR code values stored in the multimedia device. Meanwhile, a tab 1101 may be displayed showing a list of stored applications.

In a case in which the OSD is designed as shown in FIG. 11, it is possible for a user to easily and conveniently select a device which the user wishes to control while maintaining a broadcast screen which the user can watch to the maximum.

Meanwhile, two solutions for controlling an external electronic device using the remote controller may be provided. In a first embodiment, it is possible to directly control basic functions of the external electronic device without using the screen of the multimedia device, which will hereinafter be described with reference to FIG. 12. In a second embodiment, supplemental functions of the external electronic device are controlled using the screen of the multimedia device, which will be described below with reference to FIGS. 13 to 18.

Figure 12:
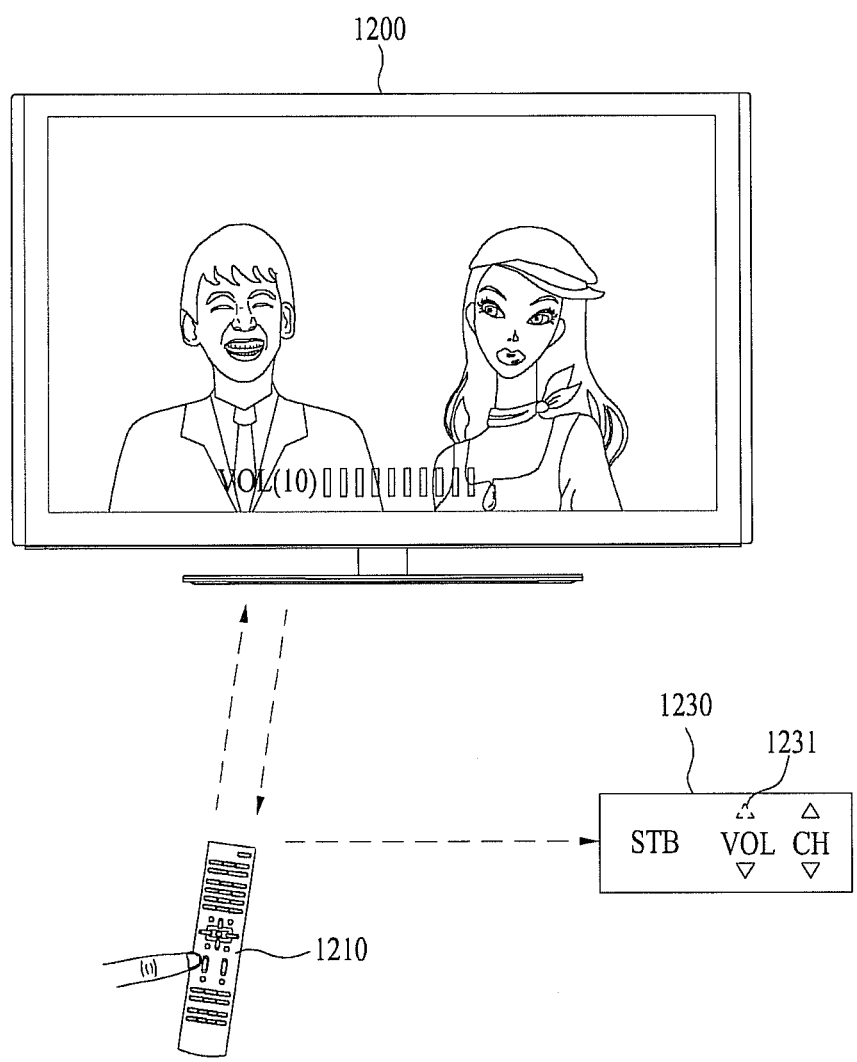
FIG. 12 is a view showing a process of controlling an external electronic device using a local key button of the remote controller according to one embodiment.

FIG. 12 is a view showing a process of controlling an external electronic device using a local key button of the remote controller according to one embodiment. Hereinafter, a process of rapidly control an external electronic device while securing the screen of the multimedia device to the maximum extent possible will be described with reference to FIG. 12.

First, selection of controlling a specific external device (for example, an STB) using the method shown in FIG. 10 or 11 is assumed. As shown in FIG. 12, a remote controller 1210 may includes a local key button for adjusting a volume of the STB or changing a channel of the STB.

When a user pushes a volume up button of the remote controller 1210, a signal for requesting an IR code value corresponding to volume up of the STB is transmitted to a multimedia device 1200. The multimedia device 1200 transmits an IR code value corresponding to volume up of the STB to the remote controller 1210, and the remote controller 1210 forwards the received IR code value to a corresponding STB 1230. Consequently, it is possible for the STB 1230 to perform a volume up function 1231 based on the IR code value received from the remote controller 1210.

Figure 13:
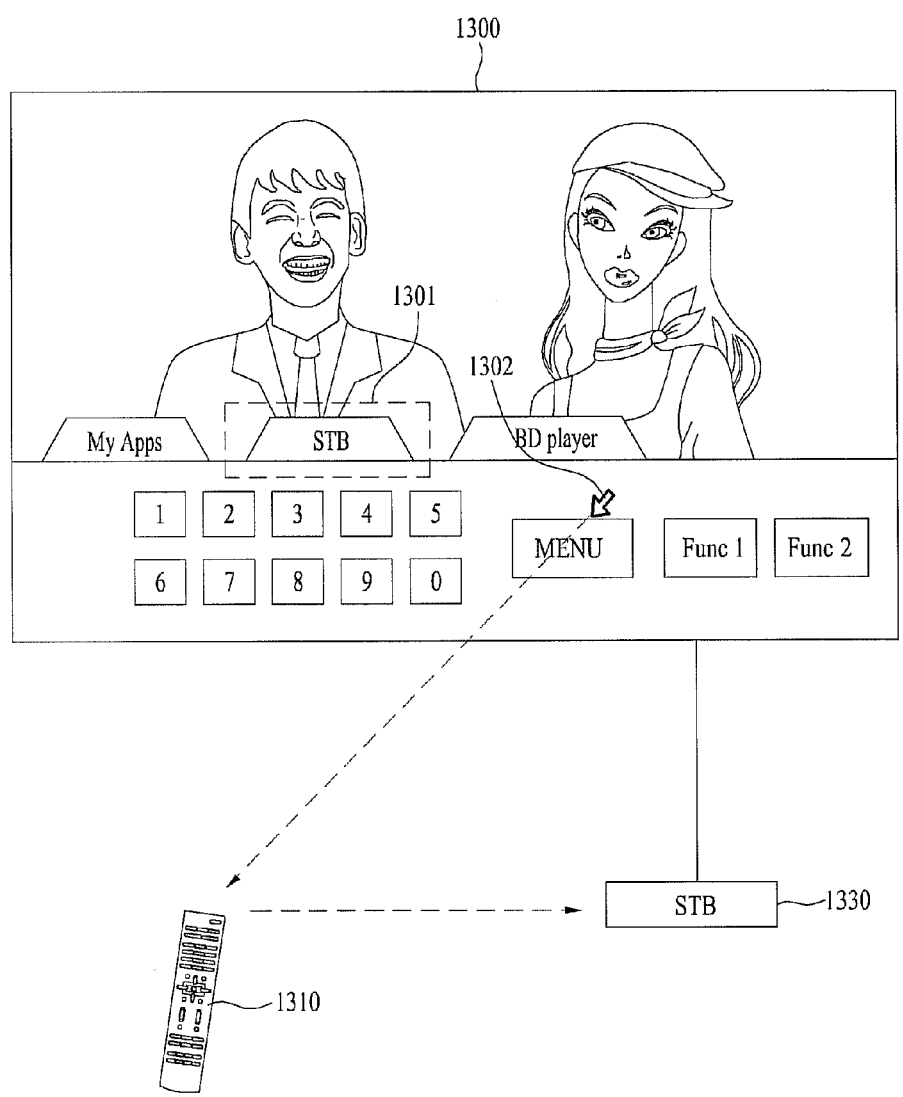
FIGS. 13 and 14 are views showing a first embodiment of controlling an external electronic device using a screen provided by the multimedia device.
Figure 14:
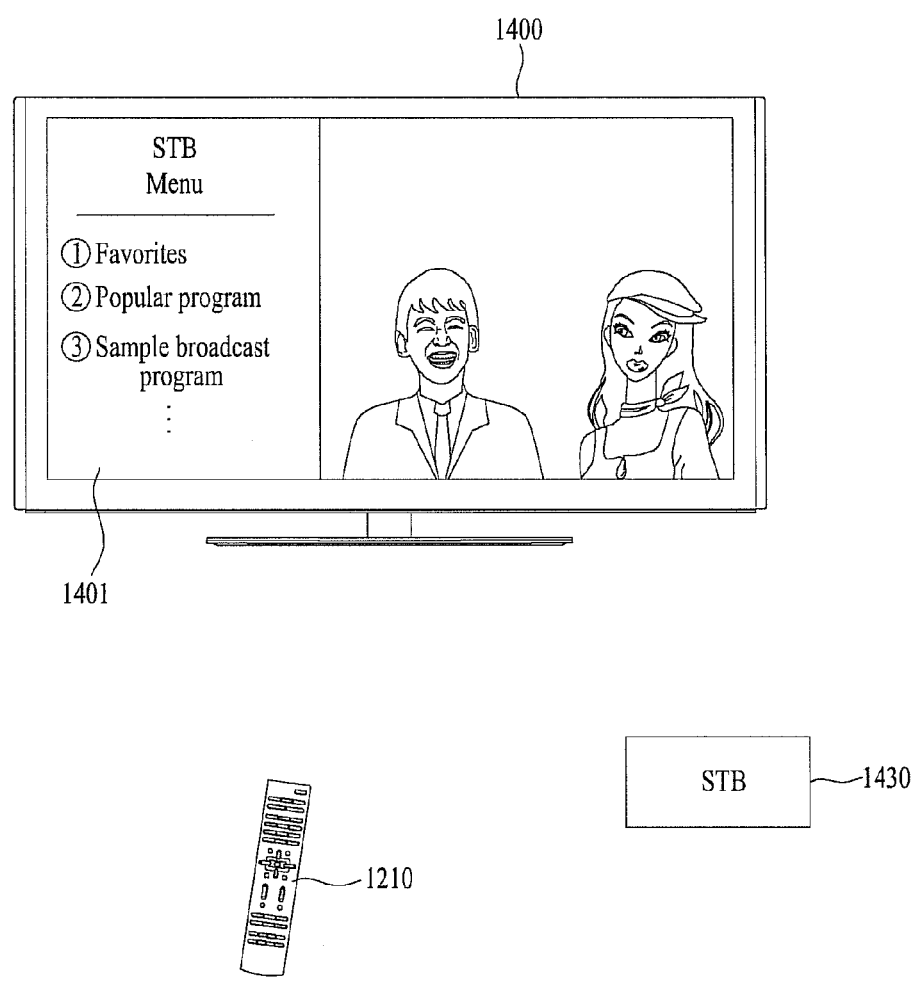

FIGS. 13 and 14 are views showing a first embodiment of controlling an external electronic device using the screen provided by the multimedia device. Hereinafter, a process of controlling a function of an external electronic device (for example, a menu function of an STB), which is not attached to the outside of the remote controller as a local key button, will be described with reference to FIGS. 13 and 14.

First, selection of a tab 1301 displaying a STB as a device to be controlled using the method shown in FIG. 11 is assumed. At this time, a multimedia device 1300 according to one embodiment displays an OSD regarding functions of the selected STB, as shown in FIG. 13. The OSD is stored in the memory of the multimedia device for each device. Functions of the OSD shown in FIG. 13 are designed in a format that can be selected by a remote controller 1310.

In a case in which a user moves the remote controller 1310 with the result that an indicator 1302 is located in a menu region of the STB, the multimedia device 1300 transmits an IR code value corresponding to the menu of the STB to the remote controller 1310. The remote controller 1310 transmits the IR code value received from the multimedia device 1300 to a corresponding electronic device, i.e. an STB 1330.

In a case in which a menu function of a STB 1430 is executed as shown in FIG. 14, therefore, a multimedia device 1400 connected to the STB 1430 displays a screen 1401 on which the STB menu is executed. Also, a specific option on screen 1410, on which the STB menu is executed, may be selected using remote controller 1410.

Figure 15:
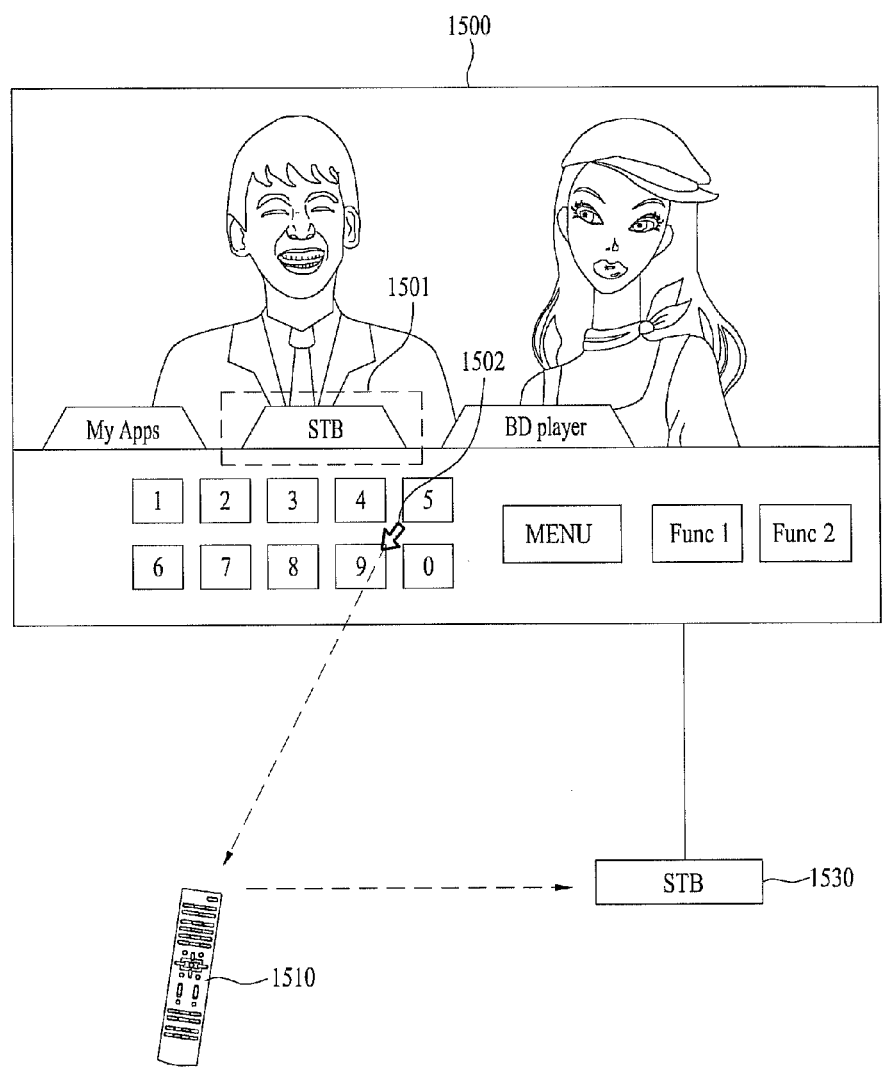
FIGS. 15 and 16 are views showing a second embodiment of controlling the external electronic device using the screen provided by the multimedia device.
Figure 16:
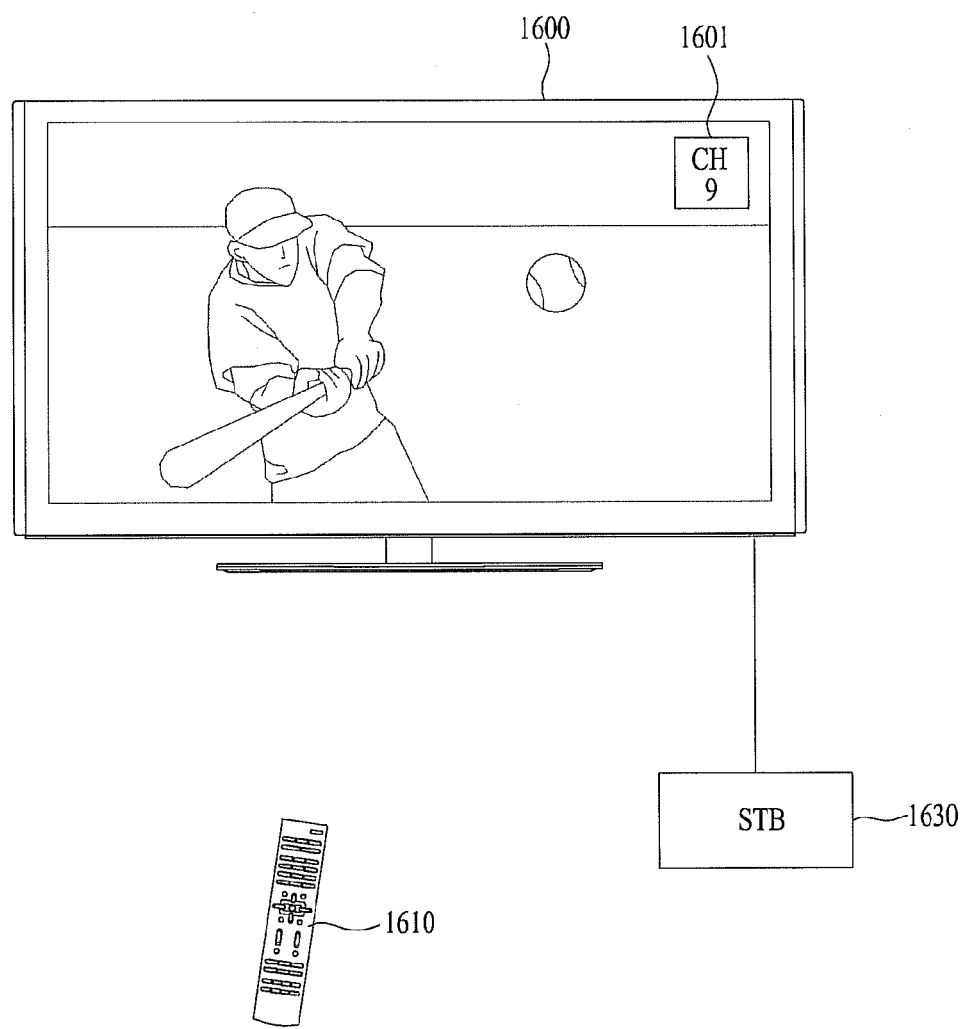

FIGS. 15 and 16 are views showing a second embodiment of controlling the external electronic device using the screen provided by the multimedia device. Hereinafter, a process of controlling a function of an external electronic device (for example, a channel 9 function of a STB), which is not attached to the outside of the remote controller as a local key button will be described with reference to FIGS. 15 and 16.

First, selection of a tab 1501 displaying a STB as a device to be controlled using the method shown in FIG. 11 is assumed. At this time, a multimedia device 1500 according to an embodiment displays an OSD regarding functions of the selected B, as shown in FIG. 15.

The OSD is stored in the memory of the multimedia device for each device. Functions of the OSD shown in FIG. 15 are designed in a format that can be selected by a remote controller 1510.

In a case in which a user moves the remote controller 1510 with the result that an indicator 1502 is located in a channel 9 region of the STB, the multimedia device 1500 transmits an IR code value corresponding to the channel 9 function of the STB to the remote controller 1510.

The remote controller 1510 transmits the IR code value received from the multimedia device 1500 to a corresponding electronic device, i.e. an STB 1530.

In a case in which a channel 9 function of a STB 1630 is executed as shown in FIG. 16, therefore, a multimedia device 1600 connected to the STB 1630 displays a screen 1601 corresponding to channel 9. Also, it is possible to further control other functions of the STB 1630 using a remote controller 1610.

Figure 17:
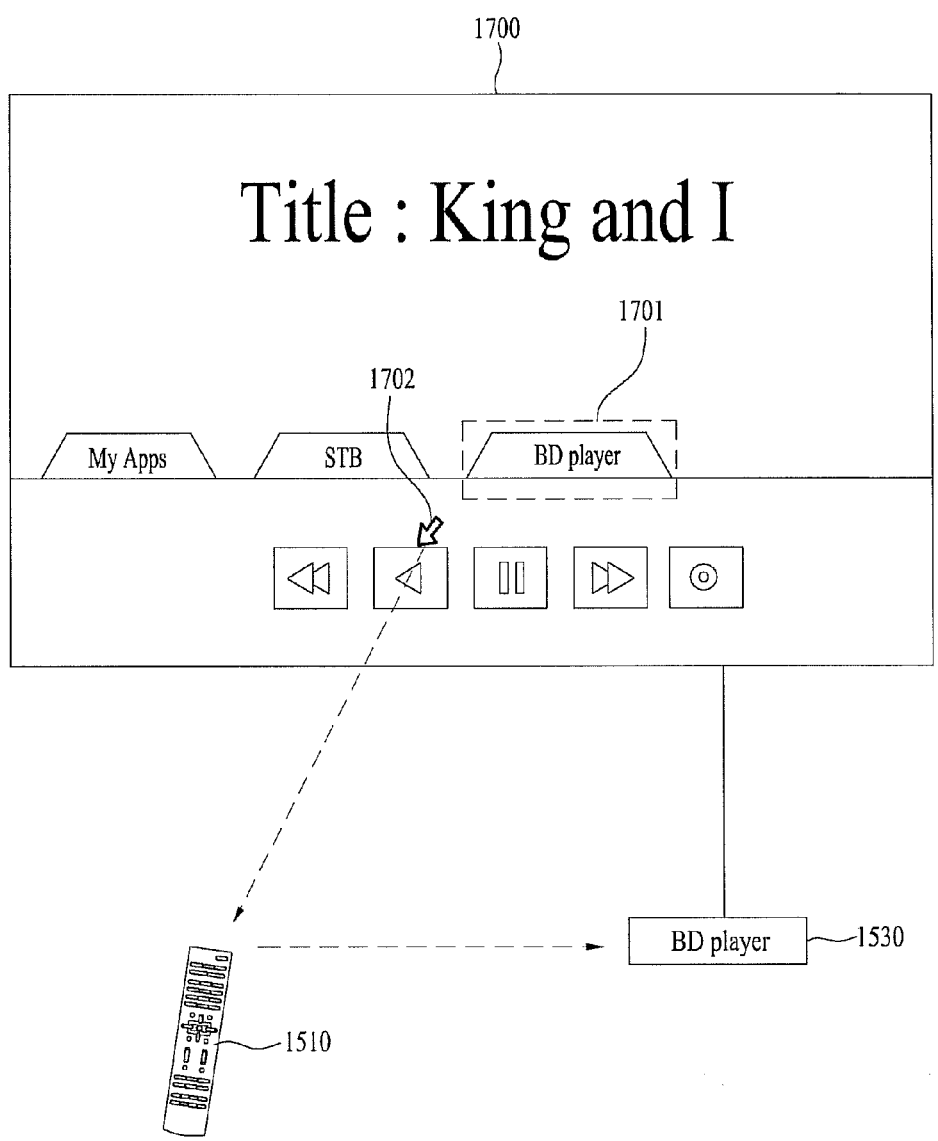
FIGS. 17 and 18 are views showing a third embodiment of controlling the external electronic device using the screen provided by the multimedia device.
Figure 18:
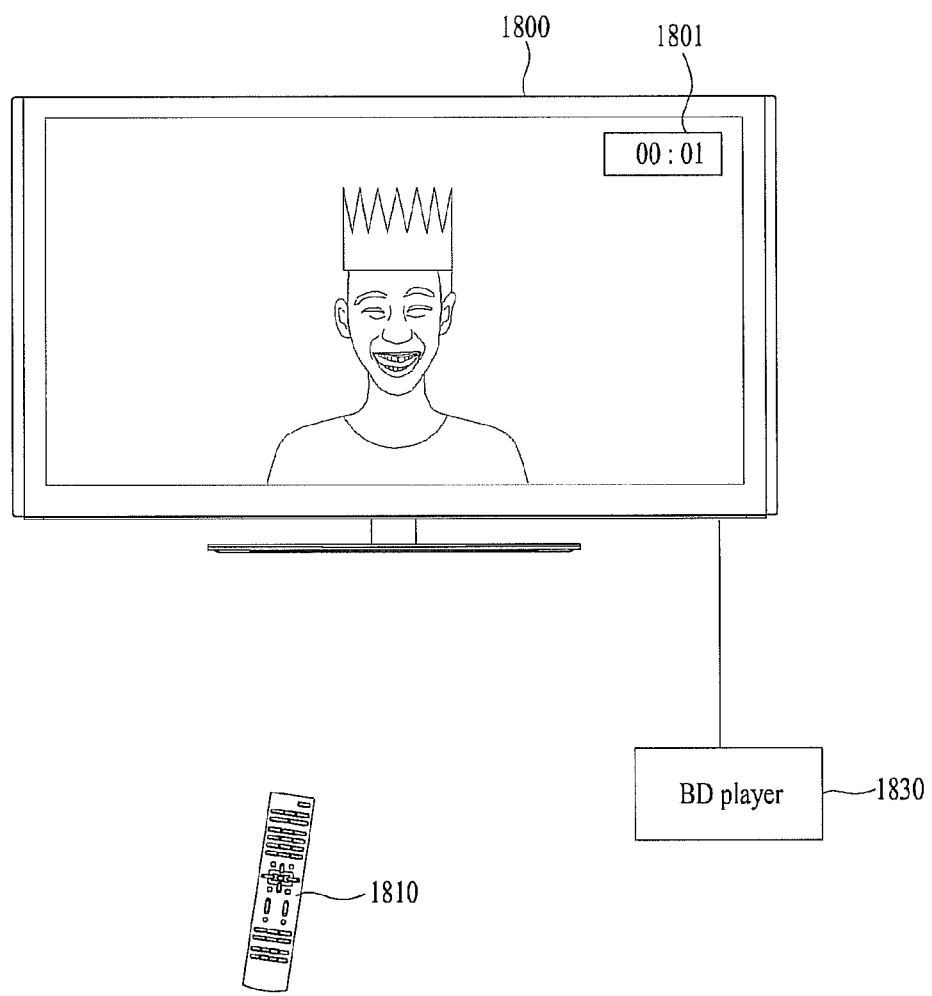

FIGS. 17 and 18 are views showing a third embodiment of controlling the external electronic device using the screen provided by the multimedia device. Hereinafter, a process of controlling a function of an external electronic device (for example, a playback function of a BD player), which is not attached to the outside of the remote controller as a local key button, will be described with reference to FIGS. 17 and 18.

First, selection of a tab 1701 displaying a BD player as a device to be controlled using the method shown in FIG. 11 is assumed. At this time, a multimedia device 1700 according to an embodiment displays an OSD regarding functions of the selected BD player, as shown in FIG. 17.

The OSD is stored in the memory of the multimedia device for each device. Functions of the OSD shown in FIG. 17 are designed in a format that can be selected by a remote controller 1710.

In a case in which a user moves the remote controller 1710 with the result that an indicator 1702 is located in a playback region of the BD player, the multimedia device 1700 transmits an IR code value corresponding to the playback function of the BD player to the remote controller 1710.

The remote controller 1710 transmits the IR code value received from the multimedia device 1700 to a corresponding electronic device, i.e. a BD player 1730.

In a case in which a playback function of a BD player 1830 is executed as shown in FIG. 18, therefore, a multimedia device 1800 connected to the BD player 1830 displays a screen 1801 playing a corresponding title. Also, it is possible to further control other functions (for example, stop, reverse, etc.) of the BD player 1830 using a remote controller 1810.

Figure 19:
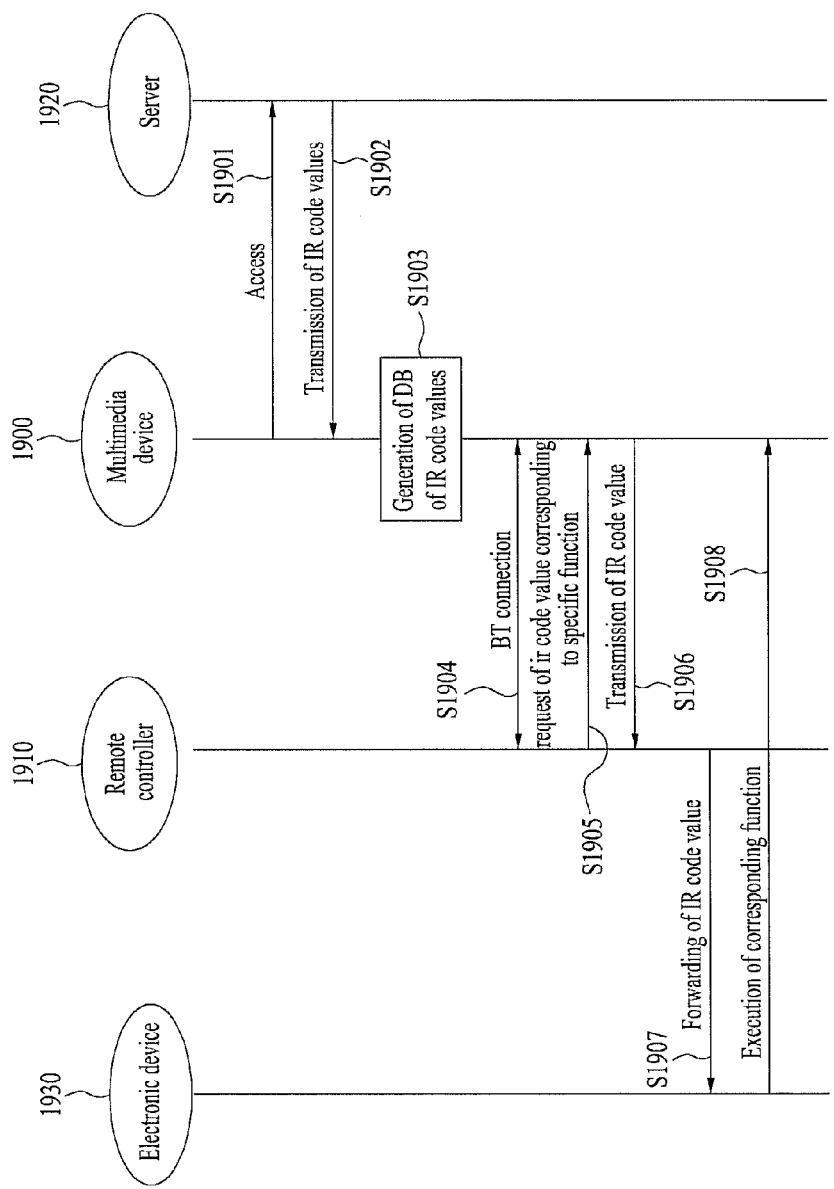
FIG. 19 is a flow chart showing the flow of data transmitted and received between the respective devices of the system shown in FIG. 1.

FIG. 19 is a flow chart showing the flow of data transmitted and received between the respective devices of the system shown in FIG. 1 in detail. Hereinafter, transmission and reception of data among a multimedia device 1900, a remote controller 1910, a server 1920, and at least one electronic device 1930 will be described with reference to FIG. 19.

The multimedia device 1900 according to one embodiment accesses to the server 1920 having IR code values (S1901). The server 1920 transmits IR code values for controlling functions of a specific electronic device to the multimedia device 1900 according to the request of the multimedia device 1900 (S1902).

The multimedia device 1900 constructs a storage for storing the IR code values received from the server 1920 (S1903). Alternatively, the IR code values may be stored in different memory addresses assigned for the respective devices as shown in FIG. 7.

The remote controller 1910 and the multimedia device 1900 are connected to each other through near field communication, such as Bluetooth (S1904). The remote controller 1910 requests an IR code value corresponding to a specific function of a specific electronic device to be controlled from the multimedia device 1900 (S1905).

The multimedia device 1900 transmits a corresponding IR code value to the remote controller 1910 according to the request of the remote controller 1910 (S1906). The remote controller 1910 forwards the received IR code value to a corresponding electronic device 1930 (S1907).

The electronic device 1930 executes a function corresponding to the IR code value (S1908). The function executed at step S1908 may be associated with, for example, a function for controlling the multimedia device 1900.

Figure 20:
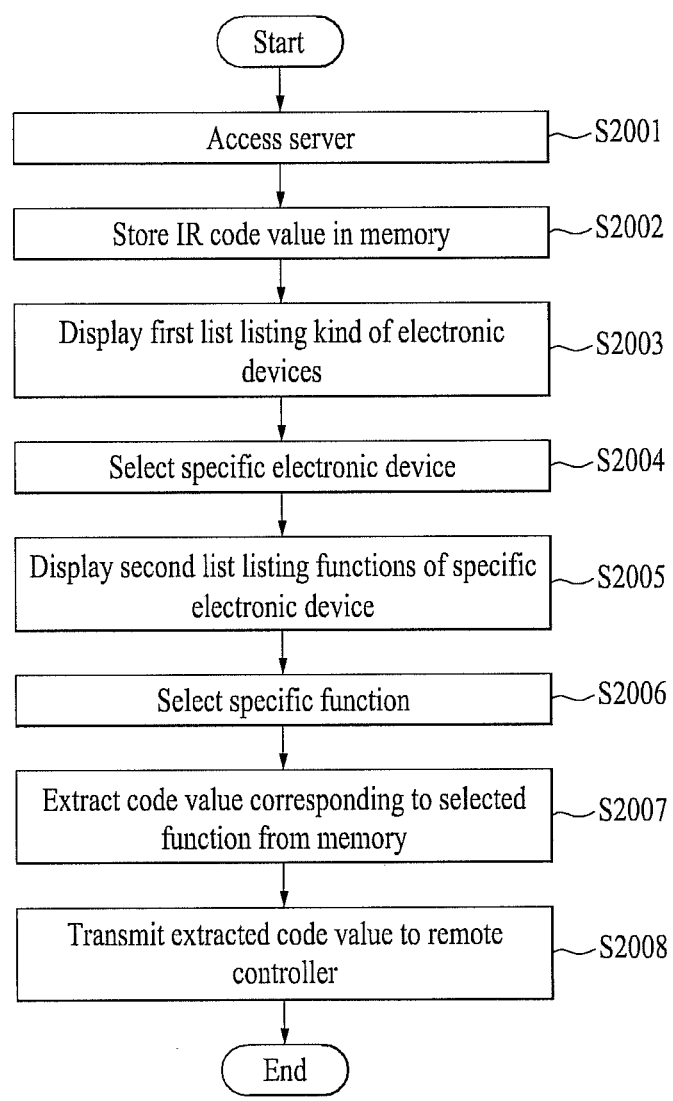
FIG. 20 is a flow chart showing a control method for a multimedia device according to one embodiment.

FIG. 20 is a flow chart showing a control method of a multimedia device according to one embodiment. In this embodiment, the multimedia device having data communication with a remote controller through a first communication path is connected to a server through a network interface unit (S2001). The multimedia device stores a code value received from the server, to which the multimedia device is connected, in the memory (S2002). The code value corresponds to, for example, a specific function of a specific electronic device. The code value is designed to be transmitted through a second communication path.

The multimedia device displays a first list listing kinds of one or more electronic devices (S2003). The multimedia device receives a signal for selecting a specific electronic device through the first communication path (S2004).

The multimedia device displays a second list listing functions of the selected electronic device (S2005). The multimedia device receives a signal for selecting a specific function of the selected electronic device through the first communication path (S2006).

The multimedia device extracts a code value corresponding to the selected function of the electronic device from the memory (S2007). The multimedia device transmits the extracted code value to the remote controller through the first communication path (S2008).

Step S2001 is designed to update the code value, for example, periodically or according to user request.

Step S2002 includes, for example, a step of storing at least one code value related to a function of a first electronic device in a first address of the memory and a step of storing at least one code value related to a function of a second electronic device in a second address of the memory.

Step S2003 and step S2005 include, for example, a step of an on screen display (OSD) generation unit generating the first list and the second list based on data stored in the memory.

Step S2004 and step S2006 are designed, for example, so that the specific electronic device or the specific function can be selected based on a position sensor of the remote controller. The position sensor may include, for example, a gyro sensor and/or an acceleration sensor.

Figure 21:
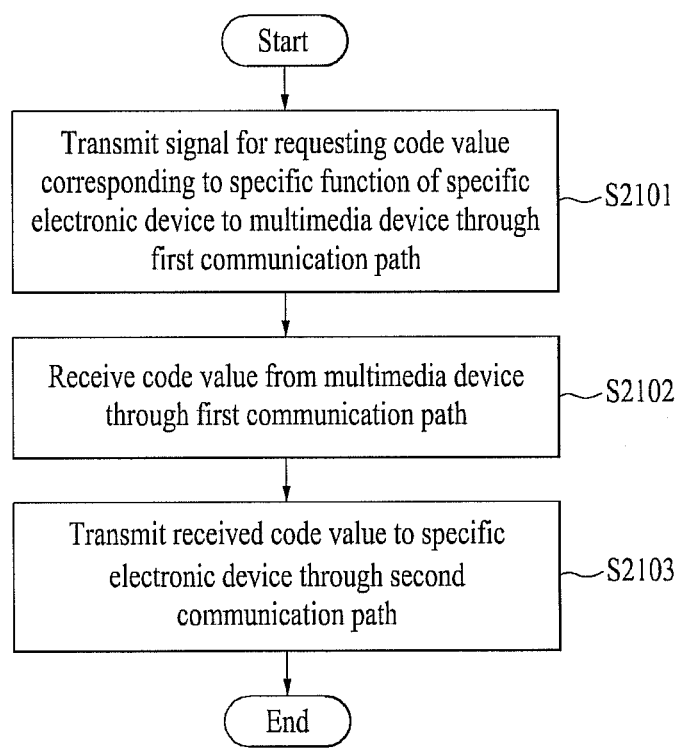
FIG. 21 is a flow chart showing a control method for a remote controller according to one embodiment.

FIG. 21 is a flow chart showing a control method of a remote controller according to one embodiment. In this embodiment, the remote controller having data communication with a multimedia device or a specific electronic device transmits a signal for requesting a code value corresponding to a specific function of a specific electronic device to be controlled by the remote controller to the multimedia device (S2101). Step S2101 is designed so that step S2101 can be carried out, for example, by the RF module 514*a* shown in FIG. 5.

The remote controller receives a code value corresponding to the specific function of the specific electronic device from the multimedia device (S2102). Step S2102 is designed so that step S2102 can be carried out, for example, by the RF module 514*a* shown in FIG. 5.

The remote controller transmits the received code value to the specific electronic device (S2103). Step S2103 is designed so that step S2102 can be carried out, for example, by the IR module 514*b* shown in FIG. 5. In addition, the first communication and the second communication are designed to employ different communication protocols.

The RF module 514*a* is designed, for example, to primarily transmit a signal for selecting the specific electronic device from among a plurality of electronic devices and to secondarily transmit a signal for requesting a code value corresponding to the specific function among a plurality of functions provided by the selected specific electronic device.

Meanwhile, the above-mentioned remote controller further includes a position sensor configured so that the position of the pointer in the screen of the multimedia device can be changed according to the motion of the remote controller as shown in FIG. 5. The position sensor may include, for example, a gyro sensor and/or an acceleration sensor.

In addition, as shown in FIGS. 2, 3, 6, and 7, the above-mentioned multimedia device includes a memory for storing a code value necessary to control at least one electronic device and a network interface module for communicating with the server to update the stored code value.

More specifically, the first communication is set to employ a Bluetooth communication protocol, and the second communication is set to employ an IR communication protocol.

Figure 22:
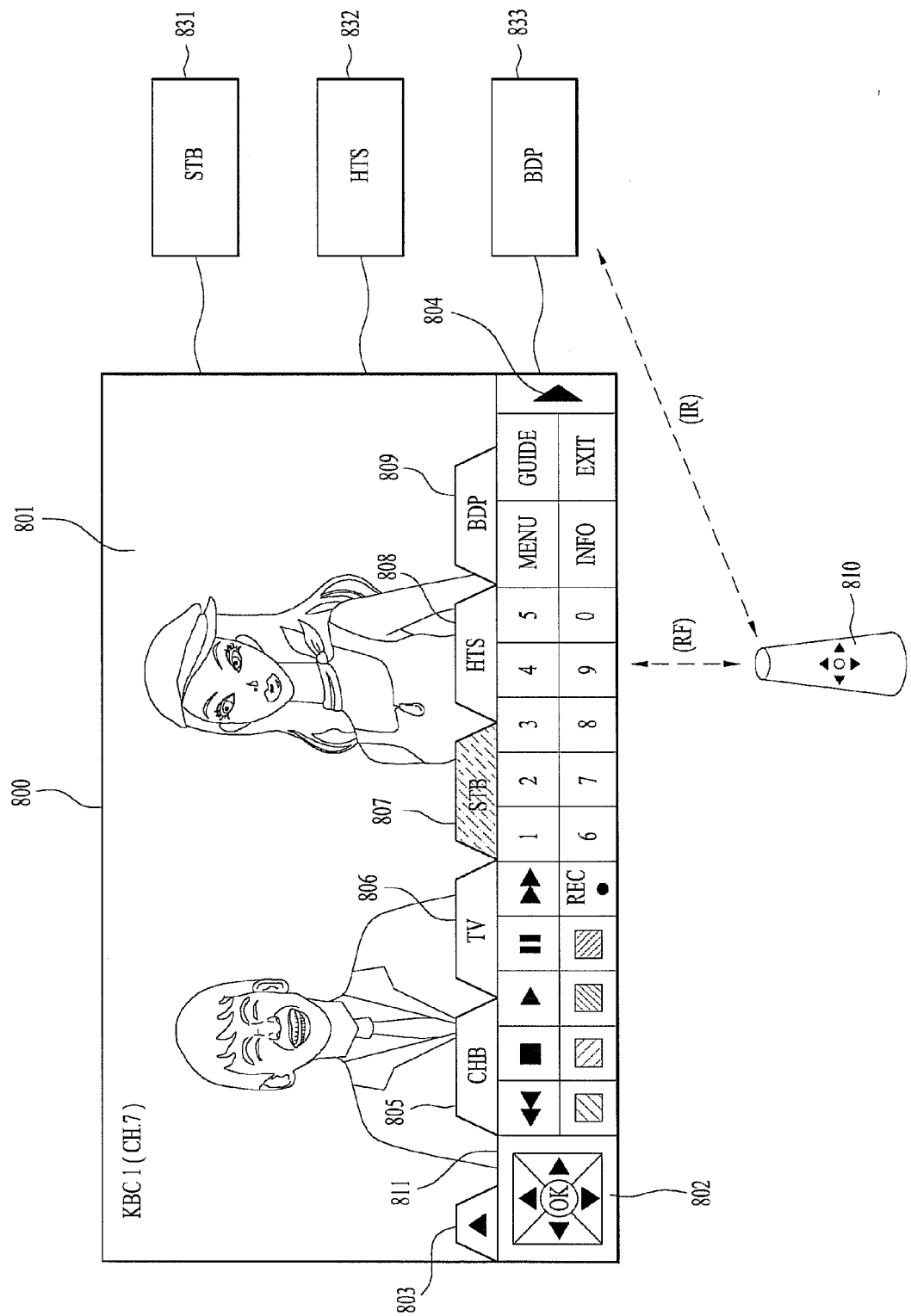
FIG. 22 is a view illustrating an overall process of controlling at least one external electronic device using the remote controller of the multimedia device according to one embodiment.

FIG. 22 is a view illustrating an overall process of controlling at least one external electronic device using the remote controller of the multimedia device according to one embodiment. As shown in FIG. 22, a multimedia device 800 according to one embodiment is connected to at least one external electronic device. For example, the multimedia device 800 is connected to a set top box (STB) 831, a home theater system (HTS) 832, and a Blu-ray disc (BD) player 833. As previously described, it is possible to control the STB 831, the HTS 832, and the BD player 833 only using a remote controller of the multimedia device 800 without using exclusive remote controllers of the STB 831, the HTS 832, and the BD player 833.

First, the multimedia device 800 may receive IR code values necessary to construct a storage from the server using identification information regarding the electronic device connected to the multimedia device 800. A more detailed solution will be described below with reference to FIG. 23, 31, or 32.

In a state in which the multimedia device 800 receives a signal for requesting an OSD for a universal remote controller from the remote controller 810 while the multimedia device 800 outputs a live broadcast screen 801, a corresponding OSD 811 is displayed. It is possible for the remote controller 810 of the multimedia device 800 to control the external electronic devices, such as the STB 831, the HTS 832, and the BD player 833, using the OSD 811 shown in FIG. 22.

The OSD 811 shown in FIG. 22 is a graphic image generated by the multimedia device 800 using IR code values received from an external server and information regarding mapped functions of an electronic device. For example, the OSD 811 includes tabs regarding a basic channel browser (CHB) 805 and a TV function 806. The OSD 811 displays electronic devices 807, 808, and 809 having IR code values connected to the multimedia device constructed as a storage in the form of selectable tabs. Meanwhile, in FIG. 22, selection of the STB 831 as an external electronic device to be controlled using the universal remote controller 810 is assumed. That is, a corresponding tab 807 is highlighted to inform a user of a device that can be controlled by the remote controller 810.

Also, the OSD 811 shown in FIG. 22 includes a graphic option 802 configured in the shape of four-way arrows. As previously described, remote controller 810 may be designed, for example, so that the position of a corresponding indicator can be changed according to the motion of the remote controller 810. The graphic option 802 is included in consideration of a case in which it is difficult to select a graphic image option received from an external electronic device, not the graphic OSD 811 generated by the multimedia device 800, which will be described below in more detail with reference to FIGS. 26 and 27.

In addition, the OSD 811 shown in FIG. 22 further includes direction tabs 803 and 804 for changing a position and content, which will be described below with reference to FIGS. 28 to 30.

Finally, the OSD 811 shown in FIG. 22 includes graphic image options for controlling functions of the specific electronic device, i.e. the STB, among the connected electronic devices. The respective options are mapped with corresponding IR code values.

In a case in which a graphic image option corresponding to a specific function (for example, number 1 or number 7) using the remote controller 810, therefore, the multimedia device 800 transmits a corresponding IR code value to the remote controller 810 in RF communication. The remote controller 810 transmits the received IR code value to the STB 831 so that a corresponding function (for example, tuning to channel 1 or channel 7) is executed.

In addition, according to another embodiment, a first control region for selecting a graphic option received from an arbitrary electronic device and a second control region for selecting a graphic option generated by the multimedia device are simultaneously displayed. The second control region corresponds to, for example, the OSD 811 shown in FIG. 22.

Meanwhile, the first control region corresponds to image data generated by the multimedia device. For example, options in a menu region 1201 transmitted from the STB shown in FIG. 26 or in a channel browser region 1301 shown in FIG. 27 cannot be selected by the motion of the remote controller along. If a specific region cannot be selected using the remote controller, a user may mistakenly believe that errors have occurred. In order to solve this problem, therefore, the graphic image 802, which is configured in the shape of four-way arrows, is added.

Figure 23:
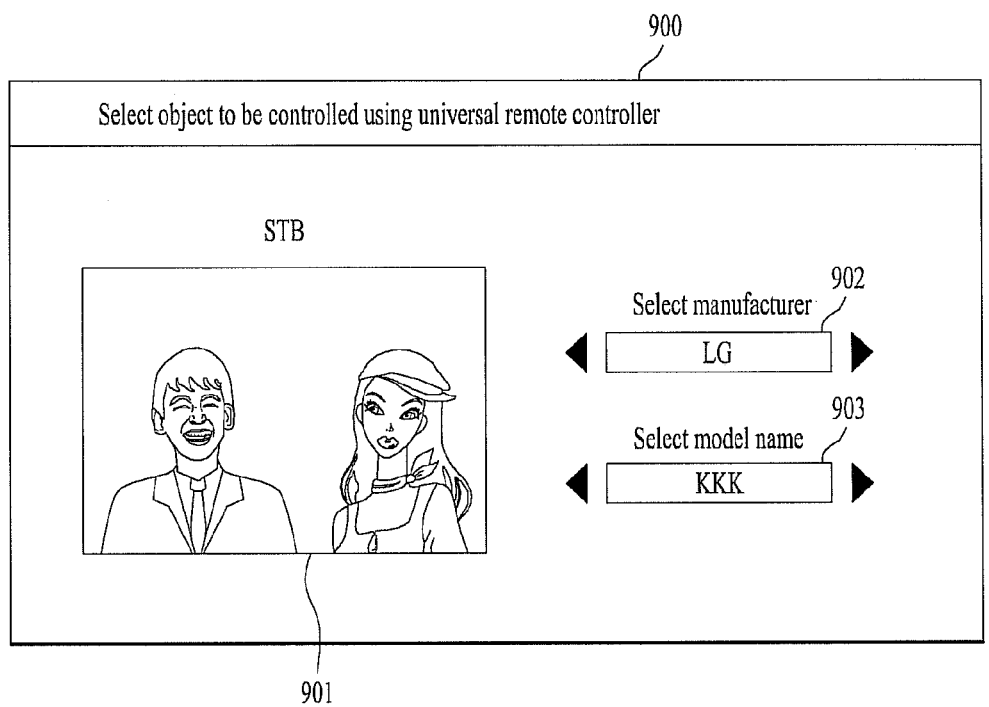
FIG. 23 is a view illustrating a process of selecting an external electronic device to be controlled using a universal remote controller according to one embodiment.

FIG. 23 is a view illustrating a process of selecting an external electronic device to be controlled using a universal remote controller according to one embodiment. As previously described, it is possible to control arbitrary electronic devices connected to the multimedia device using the remote controller. However, the multimedia device must recognize information regarding the connected electronic devices in order to receive a list of corresponding IR code values.

As shown in FIG. 23, a multimedia device 900 according to one embodiment displays an OSD for inputting information regarding an electronic device to be controlled using the remote controller.

For example, the multimedia device 900 is designed to output an option 902 for selecting a manufacture of the connected STB and an option 903 for selecting a model name of the connected STB. The multimedia device 900 is designed so that such an OSD is displayed in consideration of a possibility that different IR code value systems are used on a per manufacture basis or on a per product model name basis.

In addition, the multimedia device 900 is designed to additionally display vides data 901 presently output from the connected external electronic device as shown in FIG. 23, thereby preventing the occurrence of a user mistake and confusion. A process of a user directly inputting information regarding the external electronic device using the OSD designed as shown in FIG. 23 will be described below in more detail with reference to FIG. 31.

Although a case in which a user selects information regarding the external electronic device is assumed in FIG. 23, a solution for automatically detecting such information will be described below with reference to FIG. 32.

Figure 24:
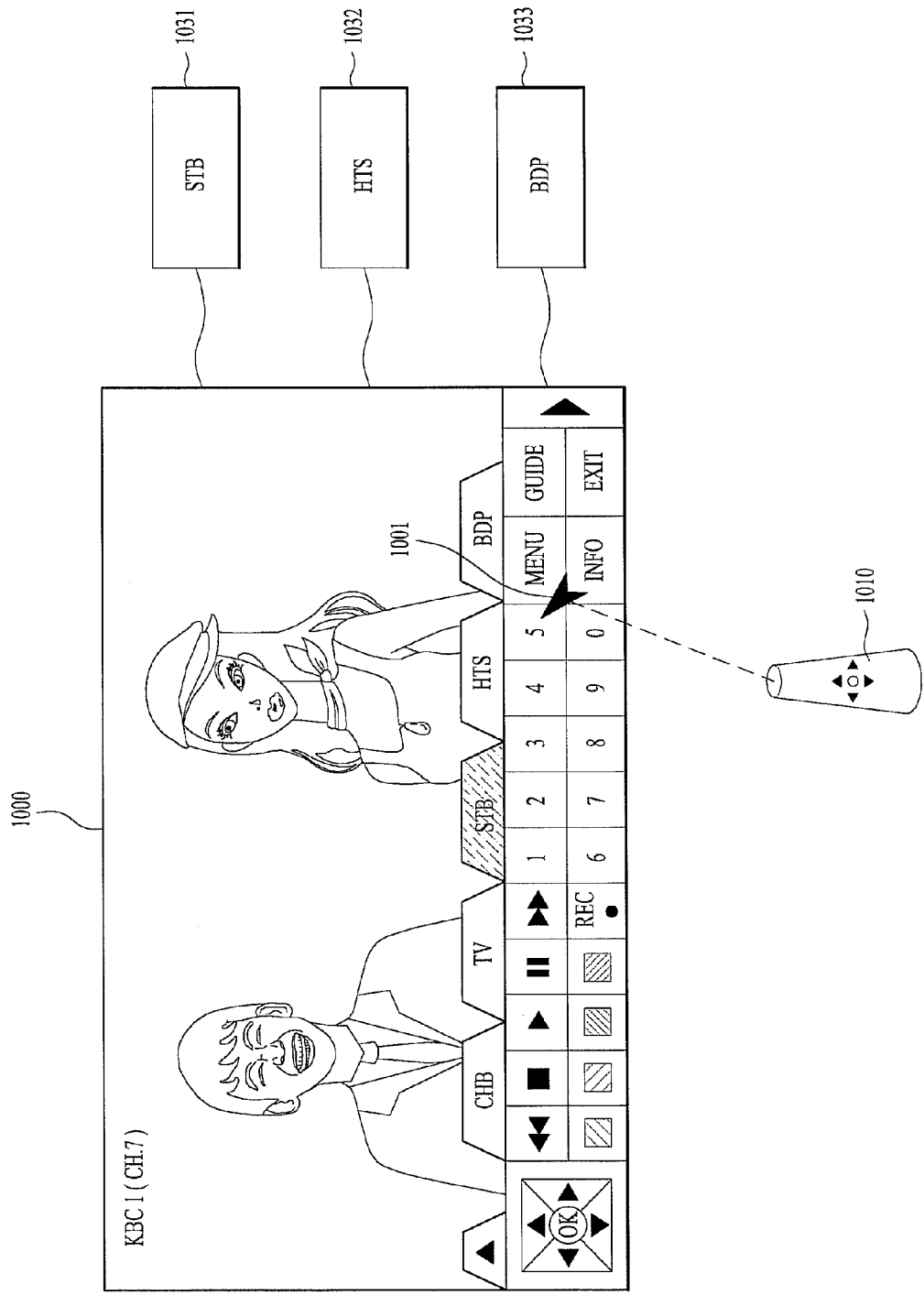
FIG. 24 is a view showing an example of an indicator displayed on the screen of the multimedia device according to the position of the universal remote controller.

FIG. 24 is a view showing an example of an indicator displayed on the screen of the multimedia device according to the position of the universal remote controller. Hereinafter, an example of an indicator displayed on the screen of the multimedia device according to the position of the universal remote controller will be described with reference to FIG. 24. Also, those skilled in the art may supplementarily interpret FIG. 24 with reference to FIG. 22, as needed.

As shown in FIG. 24, it is assumed that the multimedia device 1000 is connected to external electronic devices, such as an STB 1031, an HTS 1032, and a BDP 1033. A remote controller 1010 according to one embodiment includes a position sensor for sensing a position, direction, and speed to control the remote controller 1010, as previously described.

Also, an indicator 1001 changed according to the motion of the remote controller 1010 is displayed on the screen of the multimedia device 1000. Consequently, it is possible for a user to select an image option for controlling a specific function of an external electronic device using the remote controller 1010.

Figure 25:
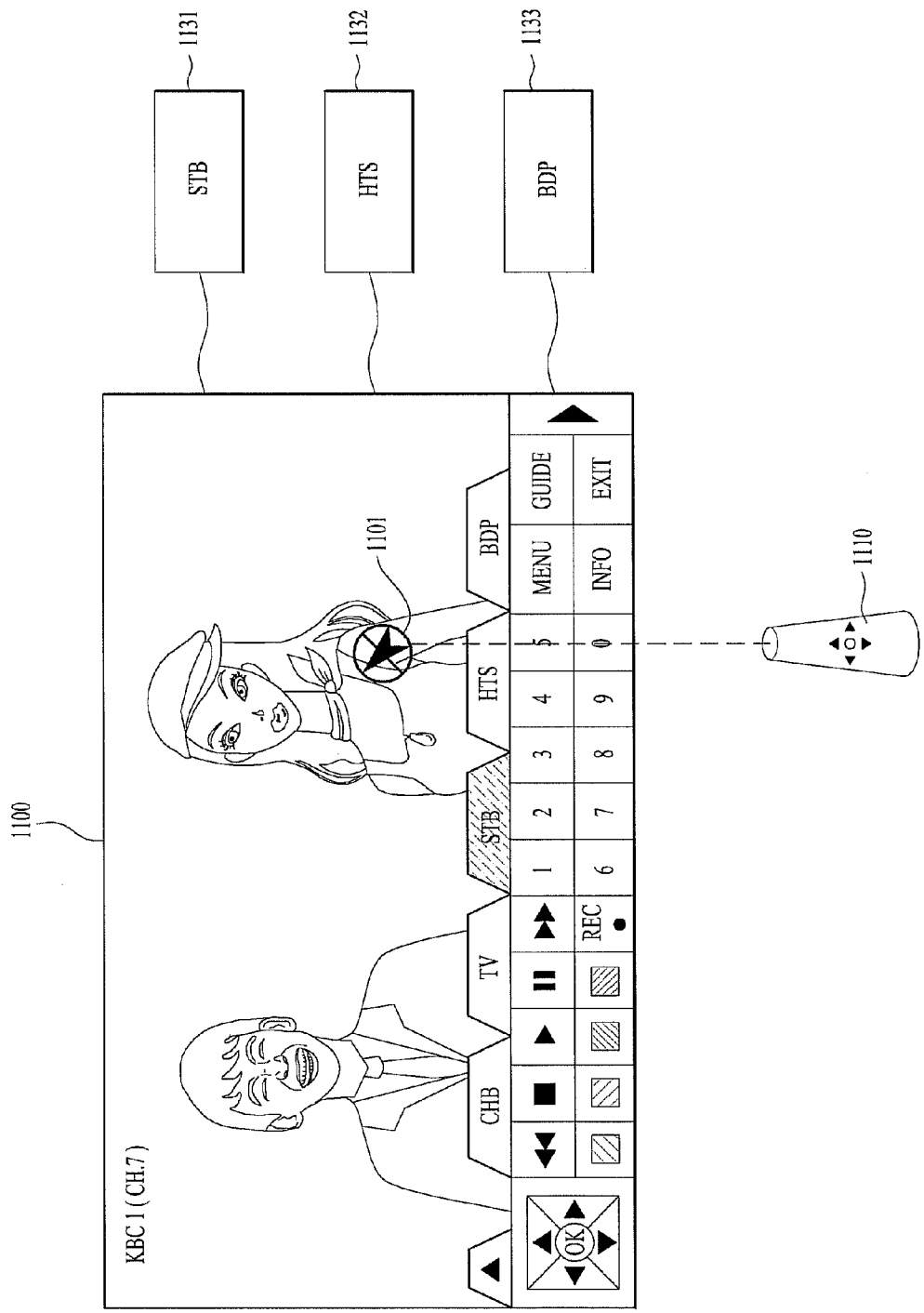
FIG. 25 is a view showing another example of the indicator displayed on the screen of the multimedia device.

FIG. 25 is a view showing another example of the indicator displayed on the screen of the multimedia device according to the position of the universal remote controller. Hereinafter, another example of the indicator displayed on the screen of the multimedia device according to the position of the universal remote controller will be described with reference to FIG. 25. Also, those skilled in the art may supplementarily interpret FIG. 25 with reference to FIGS. 22 and 24, as need.

As shown in FIG. 25, it is assumed that the multimedia device 1100 is connected to external electronic devices, such as an STB 1131, an HTS 1132, and a BDP 1133.

An indicator 1101 shown in FIG. 25 is designed such that one selected from among transparency, a shape, and a color of the indicator 1101 is different than that of the indicator 1001 shown in FIG. 24. That is, the indicator 1101 is designed such that the indicator 1101 is different from the indicator 1001 shown in FIG. 24 in a case in which the indicator 1101 deviates from a graphic image region for controlling functions of an external electronic device, and therefore, it is possible to guide the indicator into a region for controlling an external electronic device using a universal remote controller 1110.

Figure 26:
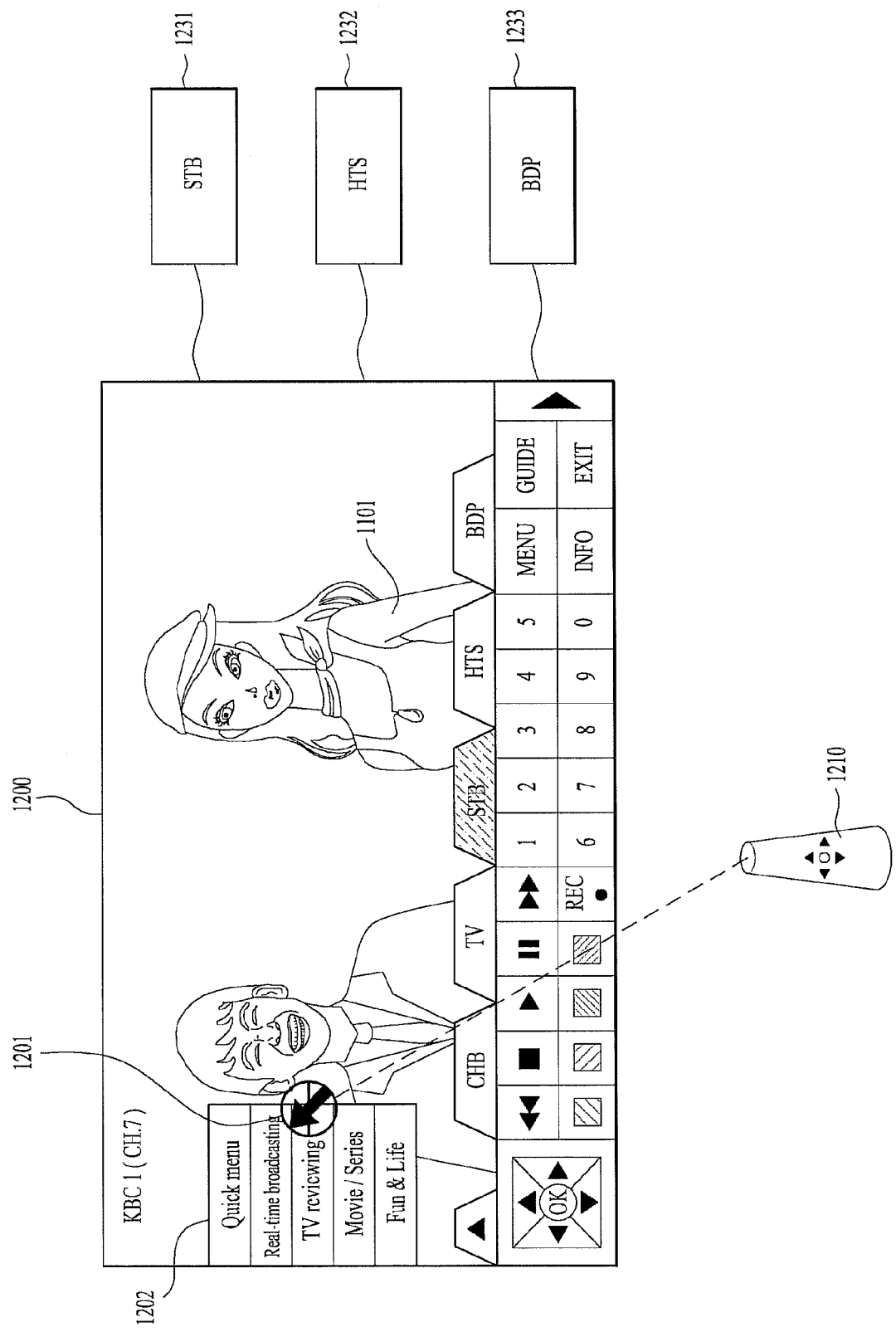
FIG. 26 is a view showing an example of a graphic image option received from an external electronic device.

FIG. 26 is a view showing an example of a graphic image option received from an external electronic device. As shown in FIG. 26, for this embodiment, it may be assumed that the multimedia device 1200 is connected to an STB 1231, an HTS 1232, and a BDP 1233, and, in particular, a mode of controlling the STB 1231 is selected. For example, it is assumed that the tab 807 for controlling the STB shown in FIG. 22 is selected.

In addition, in a case in which a menu option is selected on the OSD for the universal remote controller shown in FIG. 26, a graphic image 1202 provided by the STB 1231 is displayed.

As previously described, in the OSD graphic image for the universal remote controller generated by the multimedia device, the position of the remote controller 1210 and the corresponding indicator may be moved to select a desired specific option.

On the other hand, selectable items (for example, real-time broadcasting, TV reviewing, movie/series, fun & life, etc.) provided by the graphic image 1202 provided by the STB 1231 cannot be selected by direct positioning of an indicator 1201 corresponding to the motion of the remote controller 1210. This is because unlike the OSD for the universal remote controller, the multimedia device cannot be previously recognize the graphic image 1201 provided by the STB 1231.

If an exclusive remote controller of the STB 1231 is used in this situation, therefore, data processing speed is decreased, which leads to user inconvenience. As a first solution to solve this problem, the shape of the indicator 1201 is changed in the region 1202 that cannot be directly selected by the indicator 1210. For example, as shown in FIG. 26, a straight line graphic may appear to cover the middle of the arrow.

In addition, as a second solution, the indicator 1201 may be located at the four-way arrow button part 802 shown in FIG. 22 to easily select options in the menu image 1202 provided by the STB 1231. A more detailed process will hereinafter be described with reference to FIG. 27.

Figure 27:
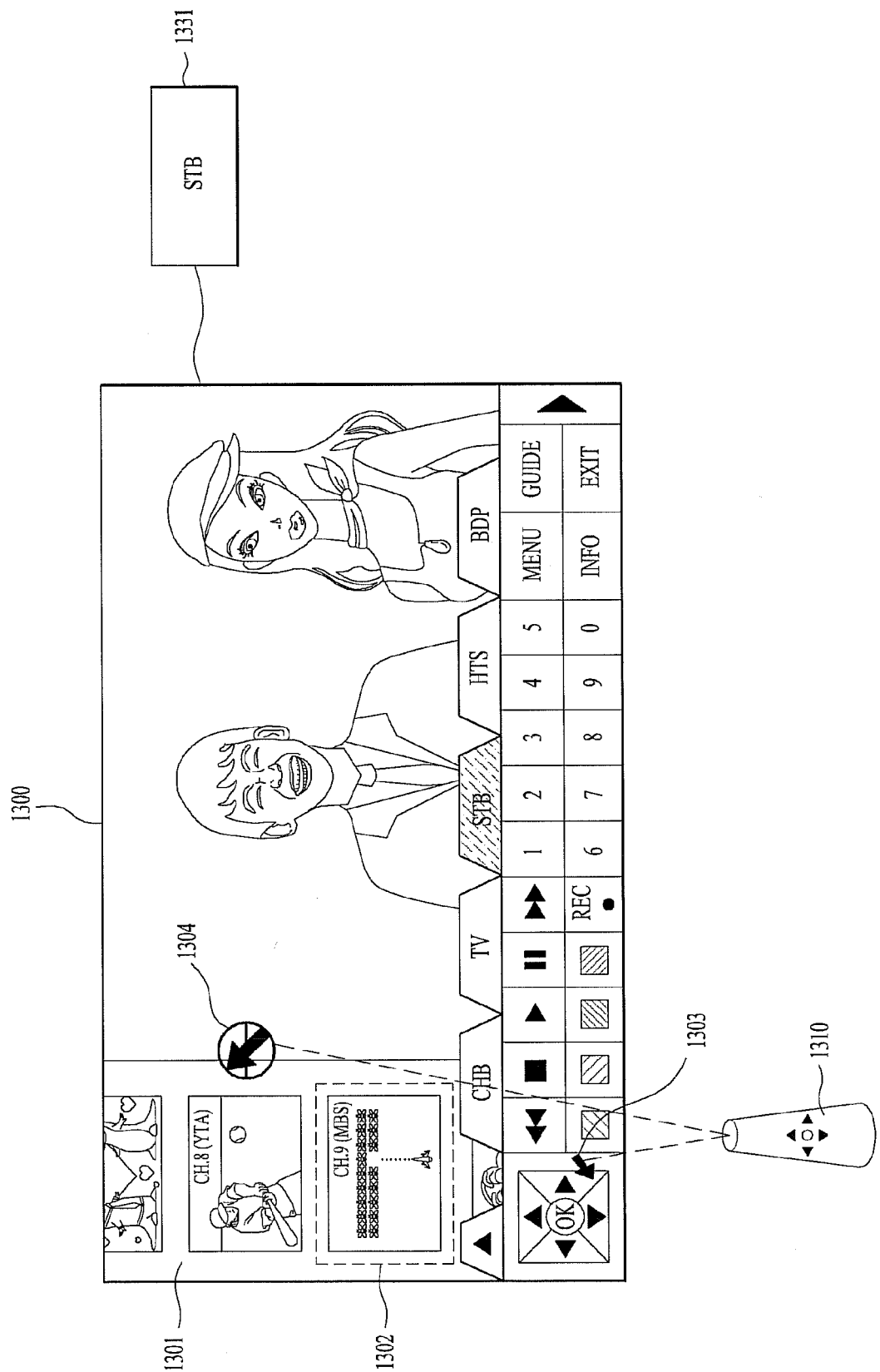
FIG. 27 is a view illustrating a process of selecting the graphic image option received from the external electronic device.

FIG. 27 is a view illustrating a process of selecting the graphic image option received from the external electronic device. The multimedia device 1300, outputting a general broadcast screen, displays a graphic image 1301 related to a channel browser provided by a STB. Of course, in a case in which the graphic image 1301 related to the channel browser is data processed by the multimedia device 1300 and is then output, the remote controller 1310 may be moved to select a desired specific channel. Meanwhile, the channel browser shown in FIG. 27 includes at least one selected from among a thumbnail image for each channel, channel information, and program information.

However, in a case in which the graphic image 1301 related to the channel browser is directly received from an external electronic device, e.g. a STB 1331, and is then output as previously described with reference to FIG. 26, an indicator, the position of which is changed according to the motion of the remote controller 1310, cannot be located in a corresponding region and cannot be directly selected. At this time, the indicator 1304 is designed so that the shape, color, and transparency of the indicator 1304 can be changed in order to inform a user that no error has occurred.

In a case in which a user wishes to select a specific channel 1302 in the channel browser image 1301 using the remote controller 1310 corresponding to the multimedia device 1300 instead of the exclusive remote controller of the STB 1331, therefore, the user may locate the indicator 1303 on the four-way arrow image.

For example, in a case in which a specific direction is selected using the remote controller 1310, an IR code value (for example, a command for moving one step in a specific direction) corresponding thereto is transmitted from the multimedia device 1300 to the remote controller 1310, and the remote controller 1310 transmits the IR code value to the STB 1331.

Figure 28A:
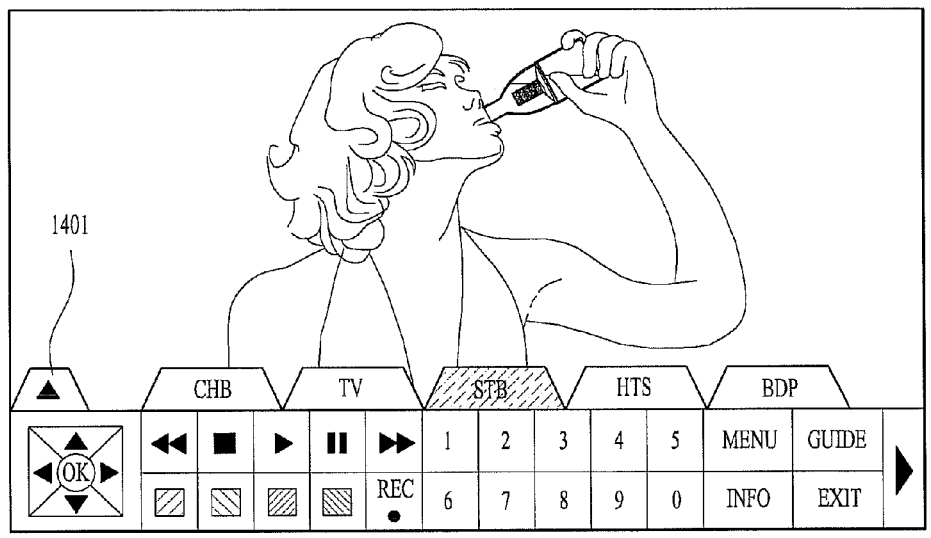
FIGS. 28A and 28B are views illustrating a process of changing the position of an OSD controlled by the universal remote controller.
Figure 28B:
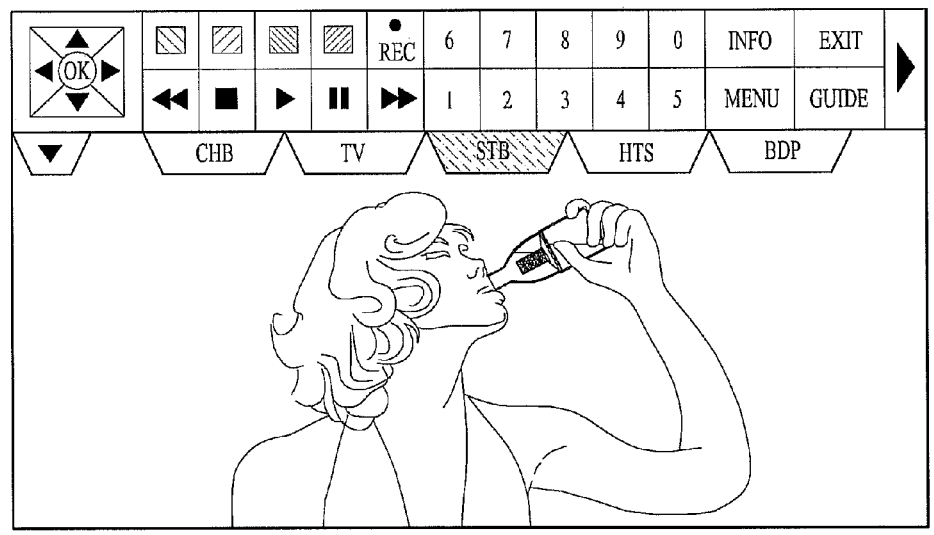

FIGS. 28A and 28B are views illustrating a process of changing the position of an OSD controlled by the universal remote controller. As needed, those skilled in the art may supplementarily interpret FIGS. 28A and 28B with reference to the previous drawings. For example, in a case in which a user wishes to change the position of an OSD for executing the universal remote controller, the user selects a specific direction tab 1401 shown in FIG. 28A. In a case in which the tab 1401 shown in FIG. 28A is selected, the position of the OSD is changed to the uppermost end of the screen as shown in FIG. 28B.

Figure 29A:
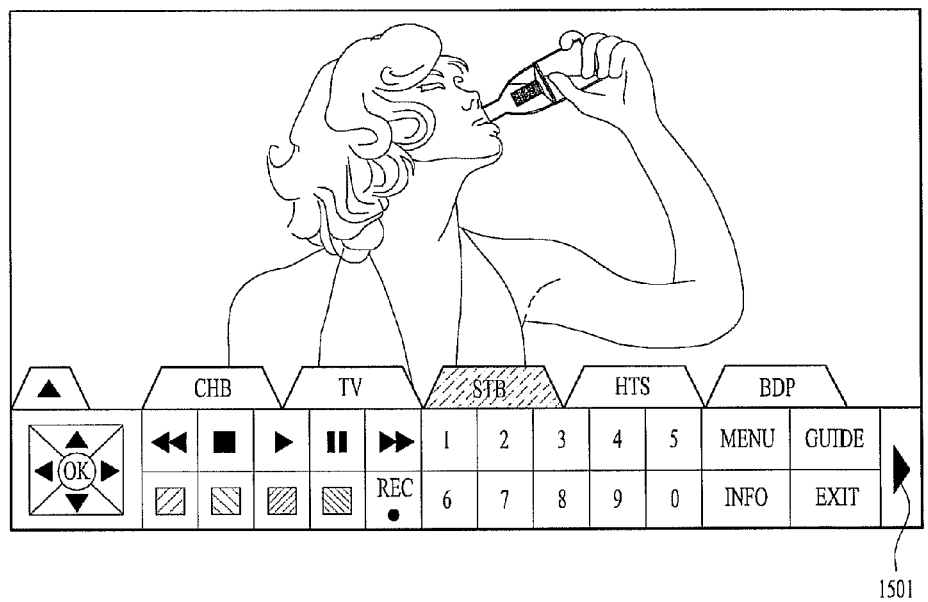
FIGS. 29A, 29B, and 29C are views illustrating a process of changing content of an OSD controlled by the universal remote controller.
Figure 29B:
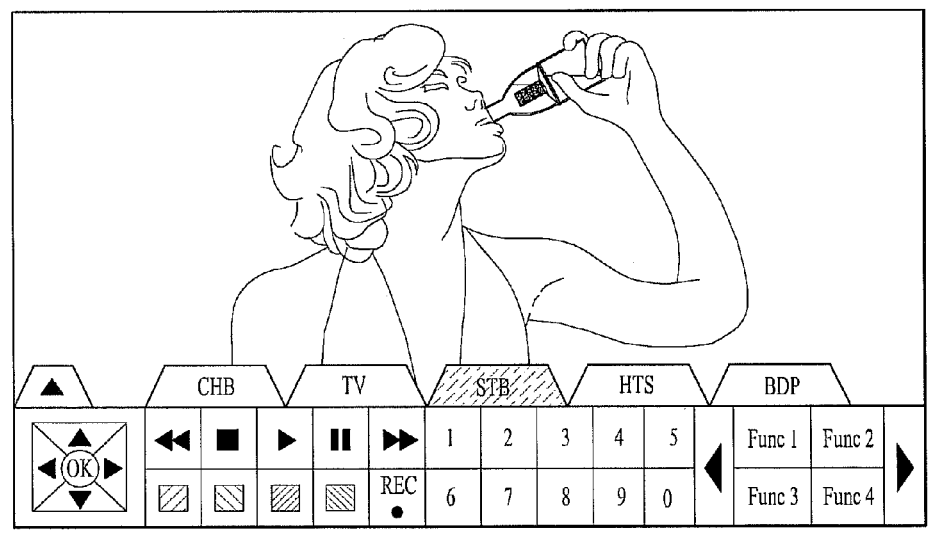
Figure 29C:
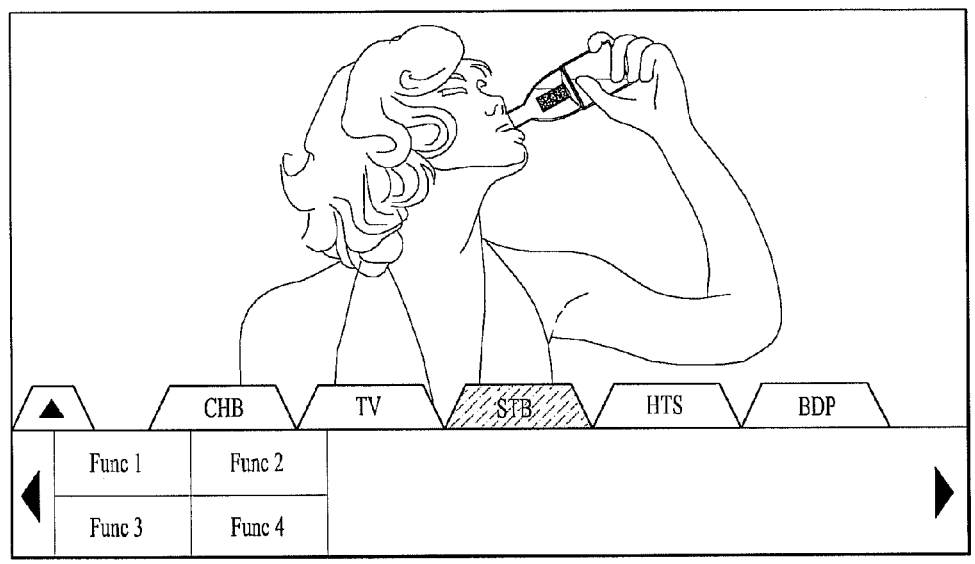

FIGS. 29A, 29B, and 29C are views illustrating a process of changing content of an OSD controlled by the universal remote controller. As needed, those skilled in the art may supplementarily interpret FIGS. 29A, 29B, and 29C with reference to the previous drawings. For example, in a case in which a user wishes to change content of an OSD for executing the universal remote controller, the user selects a specific direction tab 1501 shown in FIG. 29A. At this time, realizing the following two embodiments may be discussed.

In an embodiment, in a case in which the tab 1501 shown in FIG. 29A is selected, supplementary items on the OSD are changed as shown in FIG. 29B. For example, FIG. 29A includes menu (MENU), guide (GUIDE), information (INFO), and exit (EXIT), whereas FIG. 29B includes supplementary items, such as function 1 (Func 1) to function 4 (Func 4).

In another embodiment, in a case in which the tab 1501 shown in FIG. 29A is selected, the total page of the OSD is completely changed as shown in FIG. 29C. For example, options, such as channel numbers, hide, and only the changed supplementary items, such as function 1 (Func 1) to function 4 (Func 4), are displayed.

FIG. 29B has an advantage in that it is possible to change only the supplementary items and to add much more supplementary items than a case in which the OSD is designed as shown in FIG. 29C.

Figure 30A:
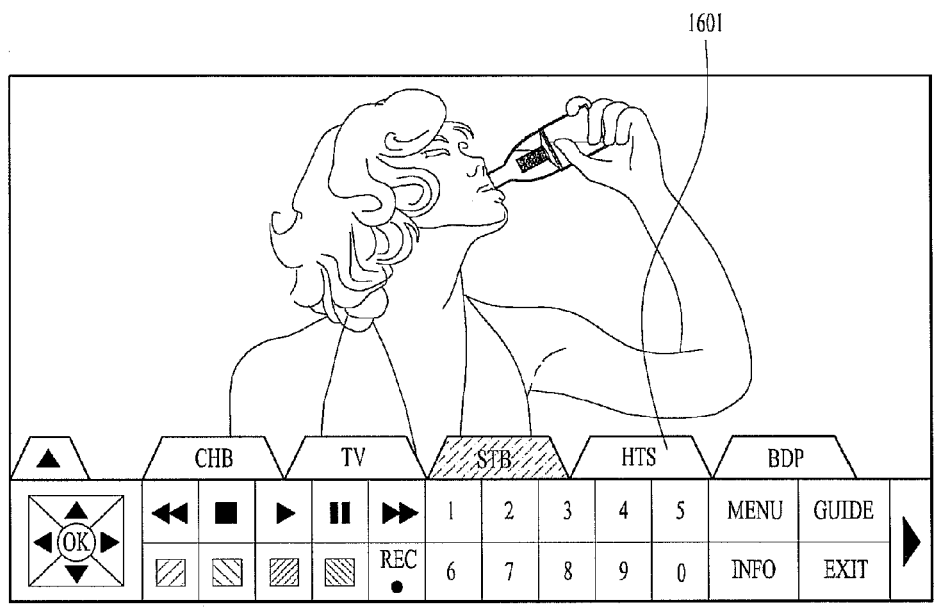
FIGS. 30A and 30B are views illustrating a process of changing an external electronic device controlled by the universal remote controller.
Figure 30B:
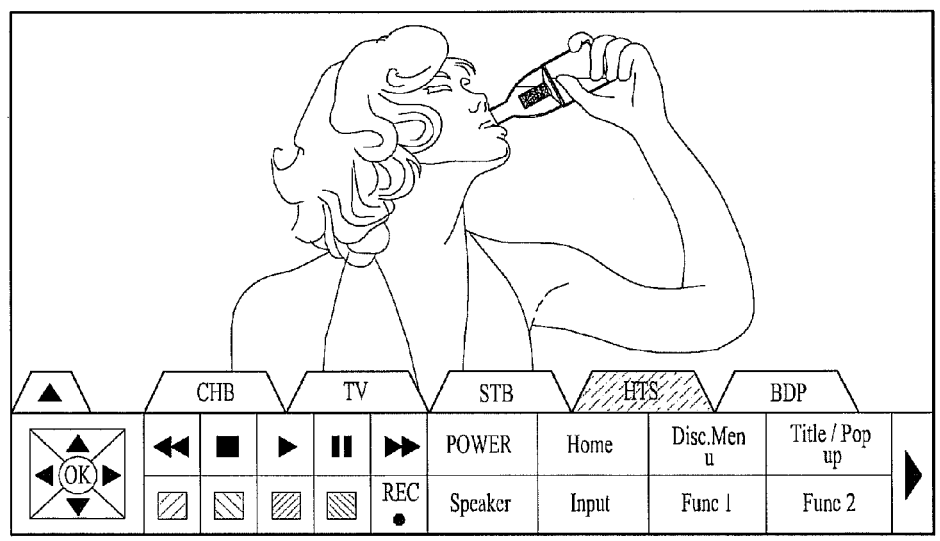

FIGS. 30A and 30B are views illustrating a process of changing an external electronic device controlled by the universal remote controller. As needed, those skilled in the art may supplementarily interpret FIGS. 30A and 30B with reference to the previous drawings.

For example, in a case in which a user wishes to change an external electronic device to be controlled using the universal remote controller, the user selects a specific tab 1601 shown in FIG. 30A. In a case in which the tab 1601 shown in FIG. 30A is selected, the OSD is changed to an OSD listing at least one function provided by an HTS as shown in FIG. 30B.

Figure 31:
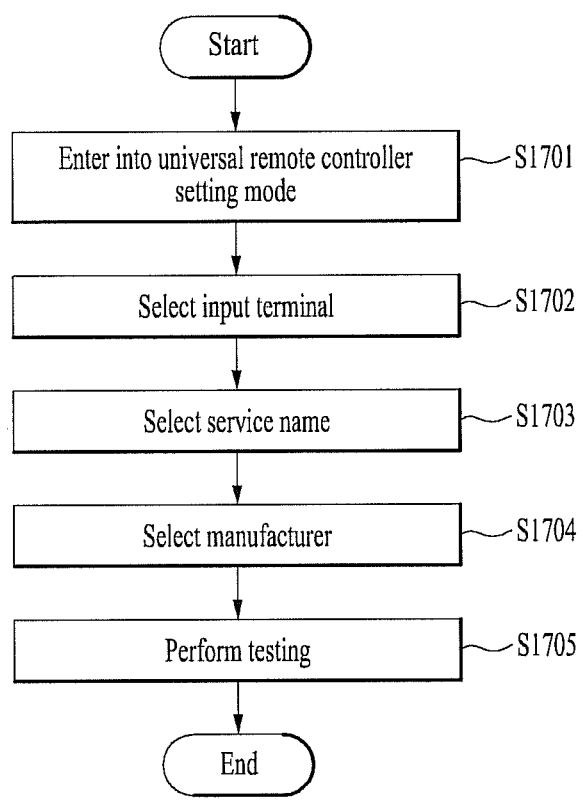
FIG. 31 is a flow chart illustrating a process of selecting an external electronic device to be controlled using the universal remote controller in accordance with one embodiment.

FIG. 31 is a flow chart illustrating a process of selecting an external electronic device to be controlled using the universal remote controller. In order to realize the embodiment, the multimedia device must know IR code values for controlling external electronic devices to be controlled or must access a server to update a storage (DB).

First, it is assumed that entry into a universal remote controller setting mode has been performed (S1701). Such realization may be achieved using, for example, the OSD shown in FIG. 23.

For example, an input terminal (for example, an HDMI terminal), to which an external electronic device, such as an STB, is connected, is selected (S1702), and a service name and manufacture name are selected (S1703 and S1704). The service name means one of the names of service companies (for example, QOOK or UPLUS) providing, for example, cable broadcasts or Internet broadcasts, and the manufacture name means one of the names of companies (for example, LG, Motorola, Samsung, etc.) manufacturing, for example, STBs.

In a case in which the multimedia device does not have an IR code value for controlling the external electronic device obtained through steps S1703 and S1704, the multimedia device accesses a server to update a related IR code value.

Finally, in a case in which updating is completed, for example, a channel up image for testing is displayed, and a user selects the displayed image using the remote controller of the multimedia device, it may be confirmed whether the channel of the connected STB is changed. More specifically, in a case in which setting has been normally achieved, the screen 901 of the present channel shown in FIG. 9 is changed to a screen of the channel changed by +1.

In the process explained with reference to FIG. 31, user selection is further necessary. A solution for solving this problem will hereinafter be described with reference to FIG. 32.

Figure 32:
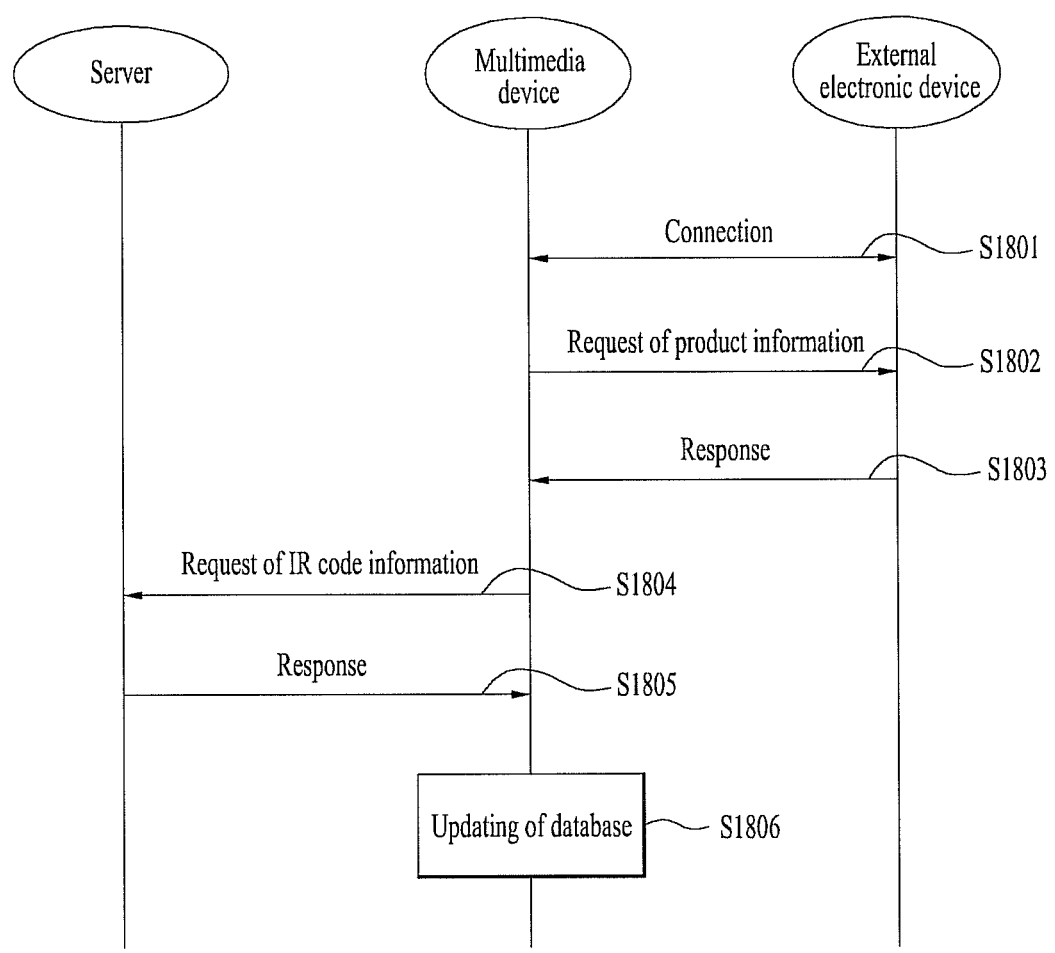
FIG. 32 is a flow chart illustrating a process of selecting an external electronic device to be controlled using the universal remote controller in accordance with another embodiment.

FIG. 32 is a flow chart illustrating a process of selecting an external electronic device to be controlled using the universal remote controller. In a case in which the multimedia device is connected to an external electronic device (S1801), the multimedia device transmits a signal for requesting product information of the connected external electronic device to the connected external electronic device (S1802).

In addition, the electronic device transmits production information of the electronic device to the multimedia device (S1803). The product information may be, for example, identification (ID) information necessary to collect IR code values necessary to control functions of the electronic device.

Also, the multimedia device requests IR code values necessary to control functions of the identified electronic device from an external server and receives the IR code values from the external server (S1804 and S1805).

Finally, the multimedia device updates a storage using the received IR code values (S1806). Consequently, it is possible to control an arbitrary external electronic device only using the remote controller of the multimedia device.

Figure 33:
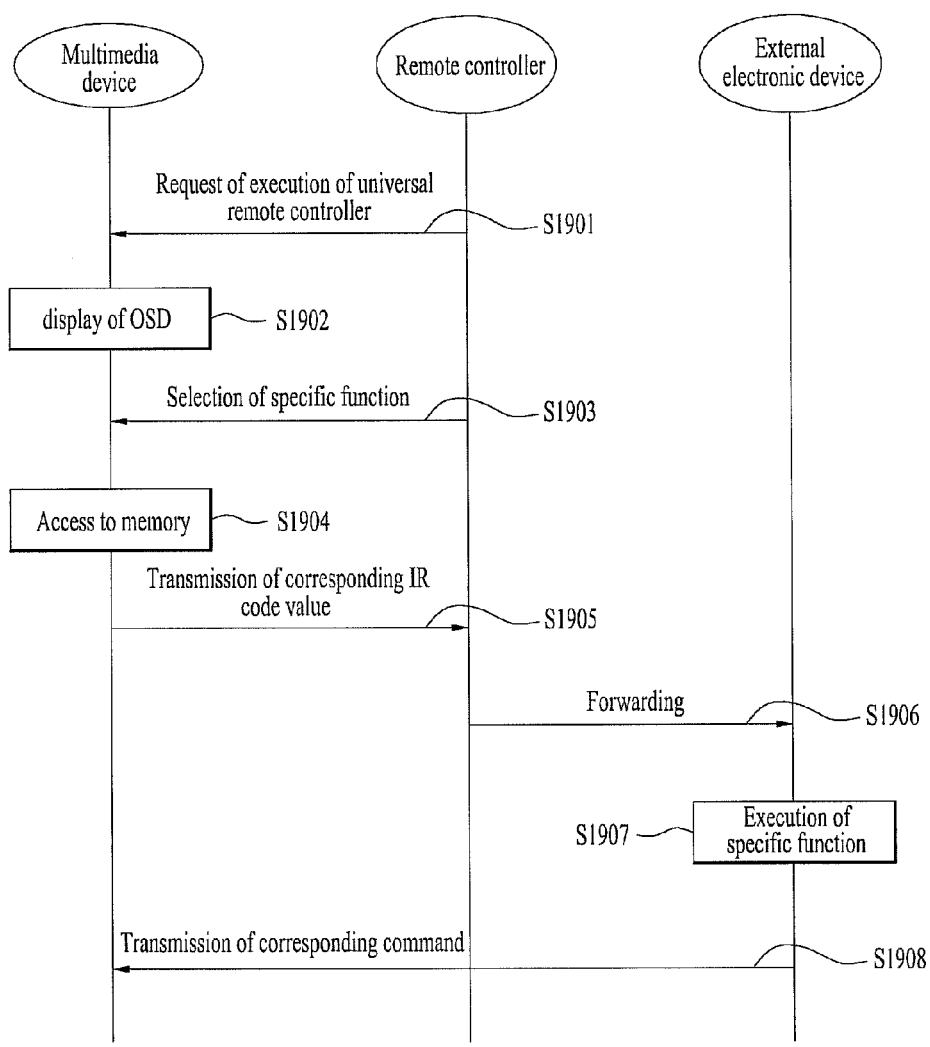
FIG. 33 is a flow chart showing an overall system process of controlling an external electronic device using the remote controller of the multimedia device in accordance with one embodiment.

FIG. 33 is a flow chart showing an overall system process of controlling an external electronic device using the remote controller of the multimedia device. Hereinafter, a method of controlling a plurality of external electronic devices using only the remote controller of the multimedia device without using exclusive remote controller of the external electronic devices.

The remote controller according to one embodiment may transmit a signal for requesting execution of a universal remote controller from the multimedia device (S1901). For example, such request may be realized by pushing a shortcut key attached to the remote controller or without manipulation of the remote controller.

In addition, the multimedia device may display an OSD related to the universal remote controller (S1902), which was previously described with reference to FIG. 22.

In a case in which the remote controller is moved to select a specific function from among graphic image options displayed at step S1902 (S1903), the multimedia device accesses to a memory (S1904) to extract an IR code value stored in the memory or an IR code value updated through access to a server.

Also, the multimedia device transmits an IR code value corresponding to a specific one of functions of an external electronic device selected by the remote controller to the remote controller (S1905).

The remote controller transmits the received IR code value to the electronic device connected to the multimedia device (S1906). Consequently, the external electronic device executes the corresponding specific function (S1907) and transmits a corresponding command to the multimedia device connected to the external electronic device in wired or wireless fashion (S1908).

It is possible to realize other embodiments from the device and the control method of the same by combining the drawings or by combining matters obvious to those skilled in the art.

Meanwhile, an operation method of the electronic device may be realized by a code written in recoding media configured to be read by a processor so that the code can be read by the processor. The recording media configured to be read by the processor include all kinds of recording devices for storing data that can be read by the processor.

Examples of the recording media configured to be read by the processor may include a read only memory (ROM), a random access memory (RAM), compact disc read only memory (CD-ROM), a magnetic tape, a floppy disc, and an optical data storage device. Also, the recording media may be realized in the form of a carrier wave, such as transmission through the Internet. Also, the recording media configured to be read by the processor may be distributed to computer systems connected to each other through a network so that a code which can be read by the processor is stored or executed in a distribution mode.

According to an embodiment, it is possible to provide a hybrid remote controller that is capable of controlling different kinds of devices in two different communication protocols.

Also, according to another embodiment, it is possible to provide a solution for controlling different kinds of devices while minimizing the use of a memory of a remote controller.

In addition, according to another embodiment, it is possible to improve a graphical user interface (GUI) of a multimedia device communicating with the hybrid remote controller. As a result, it is possible to greatly increase speed to control a plurality of devices.

Furthermore, according to a further embodiment, it is possible to control both a graphic image provided by a multimedia device and a graphic image provided by an external electronic device connected to the multimedia device using a remote controller.

Suffixes "module" and "unit" of components used in the following description are given merely for ease of explanation. The "module" and "unit" may be mingled with each other.

In accordance with one embodiment, a method for controlling a multimedia device comprises displaying information indicative of a function of an electronic device, receiving a first signal selecting the function, obtaining a code value corresponding to the selected function, and transmitting a second signal including the code value through a first link that is coupled to a remote controller, wherein the electronic device is coupled to the multimedia device for displaying images on a screen of the multimedia device.

The method further includes receiving information including the code value through a second link, wherein the second link couples the multimedia device to a server. The first signal may be received from the remote controller.

The method further includes displaying information indicative of a plurality of electronic devices and receiving a signal selecting one of the electronic devices, wherein the selected function corresponds to the selected electronic device. The information indicative of a plurality of electronic devices may include a graphical image including a plurality of selectable icons corresponding to respective ones of the electronic devices. The graphical image may be displayed simultaneously with moving images on the screen of the multimedia device.

The function of the electronic device may be a function which controls display of images on a screen of the electronic device, and the first signal may be generated based on a position of a cursor of the remote controller on the screen of the multimedia device.

In accordance with another embodiment, a multimedia device comprises a first interface, a memory to store a code value of a function corresponding to an electronic device coupled to the multimedia device through the first interface, and a controller to control information indicative of the function of the electronic device, obtain the code value stored in memory after receiving a first signal selecting the function, and transmit a second signal including the code value through a second interface coupled to a remote controller.

The third interface may be coupled to a server, wherein information including the code value is received from the server through the third interface. Also, the controller may control display of information indicative of a plurality of electronic devices and wherein a signal selecting one of the electronic devices is received through the second interface, wherein the selected function corresponds to the selected electronic device.

The information indicative of a plurality of electronic devices may include a graphical image including a plurality of selectable icons corresponding to respective ones of the electronic devices. The graphical image may be displayed simultaneously with moving images on the screen of the multimedia device. Also, the first signal may be generated based on a position of a cursor of the remote controller on the screen of the multimedia device.

In accordance with another embodiment, a method for controlling a multimedia device comprises receiving a first signal to select a function of an electronic device coupled to the multimedia device, transmitting the first signal from a remote controller to the multimedia device, receiving a code value corresponding to the selected function from the multimedia device, and transmitting a second signal including the code value to the electronic device, wherein first signal is received through a first interface and the second signal is transmitted through a second interface of the remote controller and wherein the first and second interfaces have different communication protocols.

The first signal may be generated by a button or function of the remote controller, and the code value is not stored in the remote controller prior to transmission of the first signal. The different communication protocols include an infrared protocol, a radio frequency (RF) protocol or another wireless protocol.

In accordance with another embodiment, a remote controller comprises a first interface having a first communication protocol, a second interface having a second communication protocol and a controller to receive a first signal to select a function of an electronic device coupled to a multimedia device, to transmit the first signal through the first interface to the multimedia device, to receive a code value corresponding to the selected function from the multimedia device through the first interface, and to transmits a second signal including the code value to an electronic device through the second interface, wherein the first and second interfaces have different communication protocols.

The first signal may be generated by a button or function of the remote controller, and the code value is not stored in the remote controller prior to transmission of the first signal. The different communication protocols include an infrared protocol, a radio frequency (RF) protocol or another wireless protocol.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with one or more features of the remaining embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

We claim:

1. A method for controlling a multimedia device, comprising:
    receiving an image from an electronic device, the electronic device being coupled to the multimedia device via a multimedia communication link;
    displaying the received image on a screen of the multimedia device;
    displaying an on-screen display (OSD) for indication of at least one function of the electronic device on the displayed image, the OSD is generated by the multimedia device;
    receiving a first signal from a remote controller for selecting the at least one function of the electronic device through the OSD; and
    transmitting, by the multimedia device to the remote controller, a second signal including a code value corresponding to the selected at least one function, through a first link that is coupled to the remote controller, wherein the remote controller forwards the code value received from the multimedia device to the electronic device to operate a specific function corresponding to the selected at least one function of the electronic device using a second link coupled between the remote controller and the electronic device.

2. The method of claim 1, further comprising:
    receiving, at the multimedia device, information including the code value through a third link, wherein the third link couples the multimedia device to a server.

3. The method of claim 1, further comprising:
    displaying information indicative of a plurality of electronic devices; and
    receiving a signal selecting one of the electronic devices, wherein the selected at least one function corresponds to the selected electronic device.

4. The method of claim 3, wherein the information indicative of the plurality of electronic devices includes a graphical image including a plurality of selectable icons corresponding to respective ones of the electronic devices.

5. The method of claim 1, wherein the at least one function of the electronic device is a function that controls display of images on the screen of the multimedia device.

6. The method of claim 1, wherein the first signal is generated based on a position of a cursor of the remote controller on the screen of the multimedia device.

7. A multimedia device comprising;
    a first interface;
    a memory to store a plurality of code values, each corresponding to each of functions corresponding to an electronic device coupled to the multimedia device through the first interface;
    a display; and
    a controller, the controller to receive an image from the electronic device through the first interface, control the display to display the received image, control the display to display an on-screen display (OSD) indicative of at least one function of the electronic device on the displayed image, receive a first signal from a remote controller for selecting the at least one function of the electronic device through the OSD, and transmit, by the multimedia device to the remote controller, a second signal including a code value corresponding to the selected at least one function through a second interface coupled to the remote controller, wherein the remote controller forwards the code value received from the multimedia device to the electronic device to operate a specific function corresponding to the selected at least one function of the electronic device using a third interface coupled between the remote controller and the electronic device.

8. The multimedia device of claim 7, further comprising:
    a fourth interface coupled to a server, wherein information including the code value is received from the server through the fourth interface.

9. The multimedia device of claim 7, wherein the controller controls display of information indicative of a plurality of electronic devices and wherein a signal selecting one of the electronic devices is received from the remote controller through the second interface, wherein the selected at least one function corresponds to the selected electronic device.

10. The multimedia of claim 7, wherein the first signal is generated based on a position of a cursor of the remote controller on a screen of the multimedia device.

11. A method for controlling a multimedia device, comprising:
    displaying at least one of first graphic image generated by the multimedia device indicative of at least first function of an electronic device and at least one of second graphic image received from the electronic device indicative of at least second function of the electronic device, wherein the first graphic image is displayed in a first area of a screen of the multimedia device and the second graphic image is displayed in a second area of the screen;
    receiving a first signal from a remote controller for selecting the at least first function through the at least one of first graphic image; and
    transmitting, by the multimedia device to the remote controller, a second signal including a code value corresponding to the selected at least first function, through a first link that is coupled to the remote controller, wherein the remote controller forwards the code value received from the multimedia device to the electronic device to operate a specific function corresponding to the selected at least first function of the electronic device using a second link coupled between the remote controller and the electronic device, wherein the electronic device is coupled to the multimedia device for displaying images on the screen of the multimedia device, and wherein a cursor of the remote controller on the screen is activated when the cursor is located in the first area and the cursor on the screen is deactivated when the cursor is located in the second area.

\* \* \* \* \*